United States Patent [19]

Kim

[11] Patent Number: 5,535,007
[45] Date of Patent: Jul. 9, 1996

[54] METHOD AND DEVICE FOR ADJUSTING MAGNIFICATION OF IMAGE

[75] Inventor: Eun J. Kim, Seoul, Rep. of Korea

[73] Assignee: Samsung Electronics Co., Ltd., Rep. of Korea

[21] Appl. No.: 968,815

[22] Filed: Oct. 30, 1992

[30] Foreign Application Priority Data

Apr. 30, 1992 [KR] Rep. of Korea .................. 92-7332

[51] Int. Cl.⁶ .............................. H04N 1/393; G06K 9/42
[52] U.S. Cl. ...................... 358/296; 358/451; 382/298
[58] Field of Search ........................... 358/296, 428, 431, 358/443, 444, 448, 449, 451, 452, 525; 382/47, 298

[56] References Cited

U.S. PATENT DOCUMENTS

| | | | |
|---|---|---|---|
| 4,712,141 | 12/1987 | Tomohisa et al. | 358/280 |
| 4,833,531 | 5/1989 | Abe et al. | 382/47 X |
| 5,008,752 | 4/1991 | Van Nostrand | 358/451 X |
| 5,029,017 | 7/1991 | Abe et al. | 358/451 |
| 5,189,529 | 2/1993 | Ishiwata et al. | 358/451 |
| 5,260,804 | 11/1993 | Fukutomi et al. | 358/451 X |

FOREIGN PATENT DOCUMENTS 125055   5/1988   Japan .................. H04N 1/46

*Primary Examiner*—Peter S. Wong
*Assistant Examiner*—Eric Frahm
*Attorney, Agent, or Firm*—Weingram & Zall

[57] ABSTRACT

A method and device for enlarging or reducing an original image to obtain a copy image adjusted in magnification includes designating the image input parameters and calculating the control factors in accordance with the desired magnification, scheduling the function information of the magnification needed for the magnification process to be a form of look-up table, and executing the insertion or omission of the pixel or line which correspond to the desired magnification by an interpolation method. The device includes means for executing the magnification conversion in the main-scanning direction with the insertion or removal of the pixel data, and means for inserting or omitting the scanning line with a control for the phase shift of a motor. The pitches of the output pixels in the main and sub-scanning directions can be set arbitrarily and the magnification conversion can be achieved in a unit of 1%.

10 Claims, 15 Drawing Sheets

ENLARGEMENT

REDUCTION

LEVEL

OUTPUT SIGNAL

▨ INPUT SIGNAL
☐ OUTPUT SIGNAL

LEVEL

OUTPUT SIGNAL

▨ INPUT SIGNAL
☐ OUTPUT SIGNAL

LEVEL

OUTPUT SIGNAL

▨ INPUT SIGNAL
☐ OUTPUT SIGNAL

FIG. 24A

| SCAN LINE | $y_j$ | $y_j - y_{j-1}$ | $\delta$ |
|---|---|---|---|
| 1 (ORIGIN) | $y_1 = \Delta l$ | $\Delta l$ | 01 |
| 2 | $y_2 = 2\Delta l$ | $\Delta l$ | 01 |
| 3 | $y_3 = 3\Delta l$ | $\Delta l$ | 01 |
| 4 | $y_4 = 4\Delta l$ | $\Delta l$ | 01 |
| 5 | $y_5 = 5\Delta l$ | $\Delta l$ | 01 |
| L | $y_l = l\Delta l$ | $\Delta l$ | 01 |

FIG. 24B

| SCAN LINE | $y_i$ | $y_i - y_{i-1}$ | $\delta$ |
|---|---|---|---|
| 1 (ORIGIN) | $y_1 = 2\Delta l$ | $2\Delta l$ | 10 |
| 2 | $y_2 = 4\Delta l$ | $2\Delta l$ | 10 |
| 3 | $y_3 = 6\Delta l$ | $2\Delta l$ | 10 |
| 4 | $y_4 = 8\Delta l$ | $2\Delta l$ | 10 |
| L | $y_l = 2l\Delta l$ | $2\Delta l$ | 10 |

FIG. 24C

| SCAN LINE | $y_i$ | $y_i - y_{i-1}$ | $\delta$ |
|---|---|---|---|
| 1 (ORIGIN) | $y_1 = \Delta l$ | $\Delta l$ | 01 |
| 2 | $y_2 = \Delta l$ | 0 | 00 |
| 3 | $y_3 = 2\Delta l$ | $\Delta l$ | 01 |
| 4 | $y_4 = 2\Delta l$ | 0 | 00 |
| L | $y_l = \frac{l}{2}\Delta l$ | 0 | 00 |

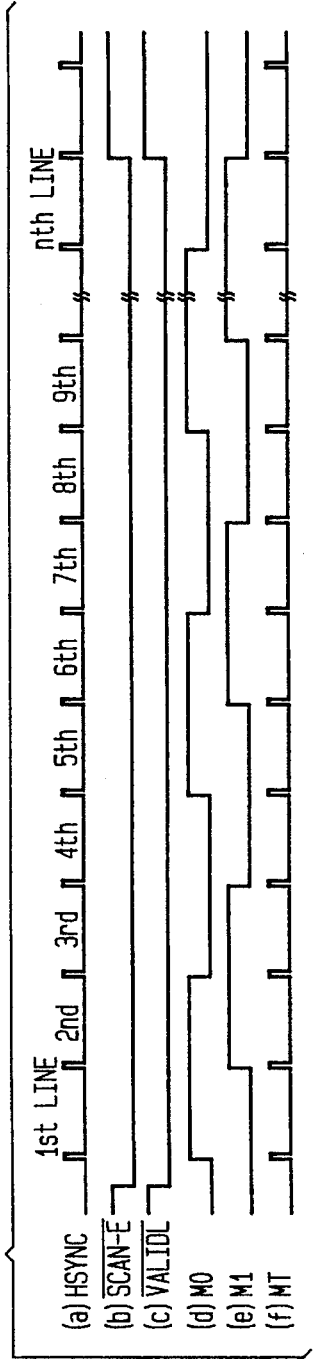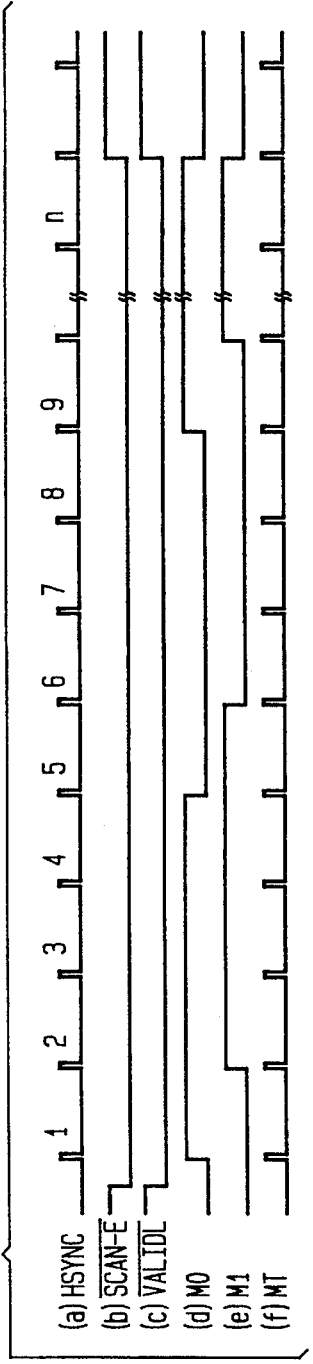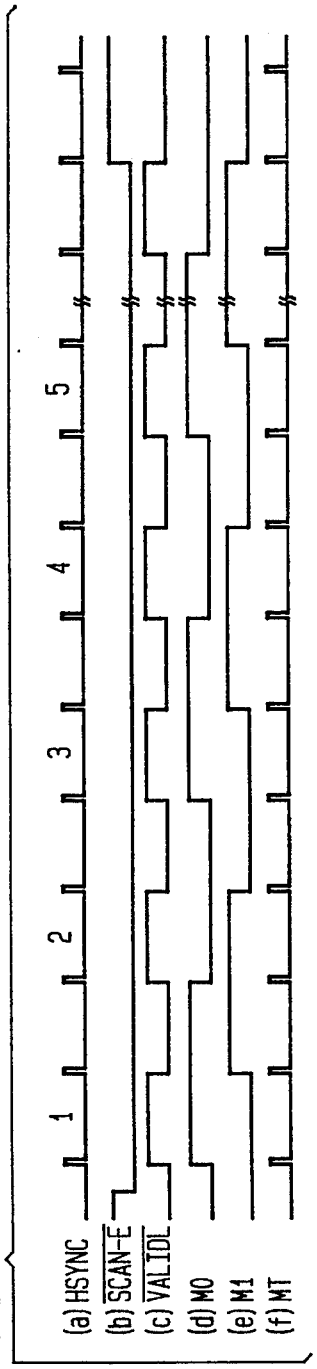

METHOD AND DEVICE FOR ADJUSTING MAGNIFICATION OF IMAGE

BACKGROUND OF THE INVENTION

1. Field of the Invention

The present invention relates to a document image process achieved by a digital image processing system such as an image scanner, a facsimile, a digital copier or the like, and more particularly, to a method and device for enlarging or reducing an original image to obtain a copy image changed in magnifying power or magnification.

2. Description of the Related Art

In a conventional digital image processing device employed in a digital copier, which can transform an original image into electrical signals by way of a photo-electric transducer well-known as an image sensor, such as a CCD sensor, the device essentially requires a magnification adjusting function for enlarging or reducing the original image so as to obtain an enlarged or reduced copy.

The conventional magnification adjustable device employed in an analog copier can adjust the magnification of the image by means of a magnifying power controllable lens which is operated through a lens driving assembly that is complicated in construction. With the conventional technique mentioned above, it is an obstacle to miniaturize the product in size from view of the recent technical tendency. Moreover, in case the image data is received by the photo-electric transducer, such as a CCD imaging sensor, the position of the spatially arranged sensor as well as the number of pixels inputted from each sensing line to be scanned by the sensor are constantly fixed with a result that a desired magnification effect cannot be assured in accordance with the change of the magnifying power (magnification) of the lens. In particular, when the image data is input through a contact image sensor (CIS), the desired magnification of the image effected through a self-focusing lens is unrealizable because the lens practically corresponds to the number of the pixels at a ratio of 1:1.

For this reason, it is considered that the magnification function of the image processing system is embodied by way of an electrical process method, particularly a digital signal processing method.

The enlargement or reduction of the image, which is carried out with a positive number magnification ratio, for example, one time, two times, three times, ..., n times with the vertical and horizontal dimensions of the original (considering the area of the original, one time, four times, nine times, ..., $n^2$ times), will be simply achieved by appropriately dividing or multiplying the clock signals.

In the magnification ratio required for an image scanner, a facsimile, a digital copier or the like, the magnification of the aforementioned positive numbered times as well as the enlargement or reduction and document size A4 to a size B4 or B5 must be simply established. In this case, a fine adjustment in magnification ratio must be assured at regular intervals of 1%.

In the conventional techniques mentioned above, however, there are drawbacks because the employment of the magnifying lens for changing the magnification of the image is unsuited for the image processing system with the CCD image sensor, and the construction of the system is greatly complicated. Alternatively, the image magnification adjusting function can be easily embodied by way of a software technique. In this case, however, there is a problem in that real time processing in the system using the pixel output speed above several MHz is difficult. For real time processing, a processor having an operating frequency higher than the pixel clock frequency is required, so a cost of embodying the system is greatly increased.

In order to solve the problems, a technique where the pixel output frequency is divided or multiplied suitably is proposed in, for example, Japanese patent publication No. 63-125055 issued to Cannon Co. Ltd. With the technique described in the patent, it is very difficult (1) to establish the fine magnification of the image in a unit of 1% and (2) to assure an accuracy timing for the magnification conversion.

Accordingly, an object of the present invention is to provide a method and device in which magnification of an image can be converted or adjusted to a unit of 1%.

Another object of the present invention is to provide a method and device for adjusting the magnification ratio of an image, which can arbitrarily select the pitch (the number of output pixel per inch) of output pixels in a horizontal (main-) scanning direction and the pitch (the number of output lines per inch) of output lines in a vertical (sub-) scanning direction.

To achieve the above objects, according to the present invention, there is provided a method for adjusting the magnification of an image, the method including the steps of:

designating image input parameters and producing control factors when a desired magnification of an original image is set: scheduling function information required for the desired magnification processing in main and sub-scanning directions into a form of a look-up table by using the image input parameters and control factors; and carrying out a pixel inserting process and a scan line inserting process at a predetermined interval when the enlarging magnification of the original image is set depending on the function information and, otherwise, carrying out a pixel removing process and a scan line removing process at a predetermined interval when the reducing magnification of the image is set by the function information.

According to a preferred embodiment of the invention, the step of scheduling the look-up table includes: sequentially providing magnification conversion address x' of the main-scanning direction from a main-scanning magnification LUT address i and storing the magnification conversion address into a main-scanning magnification look-up table; and calculating a scanning position corresponding to a sub-scanning magnification from a sub-scanning magnification LUT address j to determine a relative scanning position 6 of a subsequent scanning line in order and storing the determined position into a sub-scanning magnification conversion look-up table.

According to another embodiment of the invention, the step of processing the magnification includes: selecting any block of at least logically blocked memory banks as an image data storage memory and selecting the other block as a magnification processing memory in synchronous with a line scanning start signal L-CNT; storing the image data in the image data from the magnification processing memory to interpolate the data by way of a predetermined interpolation method so as to accomplish the desired magnification of the image in the main-scanning direction; and shifting a phase of a motor on the basis of the magnification processing function information of the sub-scanning direction to control a position of a sensor module so as to complete the desired magnification process in the direction.

The present invention is directed also to a device for adjusting magnification of an image, and includes: magnification processing means of a main-scanning direction for inserting or removing data related to at least one pixel to or from input pixel data on the same scanning line at a predetermined pixel interval in accordance with horizontal magnification ration; and magnification processing means of a sub-scanning direction for inserting or removing data related to at least one scanning line or from pixel data of each scanning line at a predetermined line interval in accordance with a vertical magnification ration.

According to the invention, the magnification processing means of the main-scanning direction includes a first address generating means for generating the image registration address to store input image data IMG-IN in synchronous with a pixel clock signal P-CLK; a second address generating means for generating the reading magnification address to execute the magnification process in accordance with the horizontal magnification in synchronous with a magnification clock signal CON-CLK; first and second memory means for alternatively storing the input image data IMG-IN; a control means for dividing the line scanning start signal L-CNT by ½ to simultaneously produce a storage control signal for storing the scanned image data and a reading control signal for accessing the first and second memory means so as to execute the desired magnification adjusting or converting process; a magnification adjustable means for adjusting the magnification of the image data provided from the first or second memory means by way of a predetermined interpolation method; and means for determining data transferring paths between the first or second memory means and the first address generating means and between the second or first memory means, the magnification adjustable means and an input data transferring path on the basis of the storage control signal and reading control signal supplied from the control means.

According to the invention, the second address generating means includes a look-up table memory means for storing the magnification address data of the main-scanning direction from a central processing unit (CPU) in a form of the look-up table; and means controlled by a control signal LUT-CS from the CPU for defining a path throughout which the main-scanning magnification LUT address data and magnification address data of the main-scanning direction are transferred.

According to still another feature of the invention, the second address generating means includes an exclusive arithmatic logic unit (ALU).

According to still yet another feature of the invention, the magnification adjustable processing means of the sub-scanning direction comprises a third address generating means for generating the magnification address of the sub-scanning direction in synchronous with the line scanning start signal L-CNT; a relative position storage memory controlled by a predetermined control signal YLUT-CS for storing a relative scanning position data δ related to a subsequent line into an area of the memory designated by the sub-scanning magnification address; and a control means for controlling a phase shift of a motor on the basis of the relative position data δ. These and other objects, features and advantage of the present invention will be apparent from the following description taken with reference to the accompanying drawings.

BRIEF DESCRIPTION OF THE DRAWINGS

FIGS. 24a–24c illustrates examples of control factors corresponding to a vertical magnification ration;

FIG. 25 shows waveforms of vertical zooming control signals in the scanning of 1:1;

FIG. 26 shows waveforms of vertical zooming control signals in the scanning of 1:2; and FIG. 27 shows waveforms of vertical zooming control signals in the scanning of 2:1.

DETAILED DESCRIPTION OF THE PREFERRED EMBODIMENTS

The present invention will be described in detail with reference to the accompanying drawings.

Figure 1:
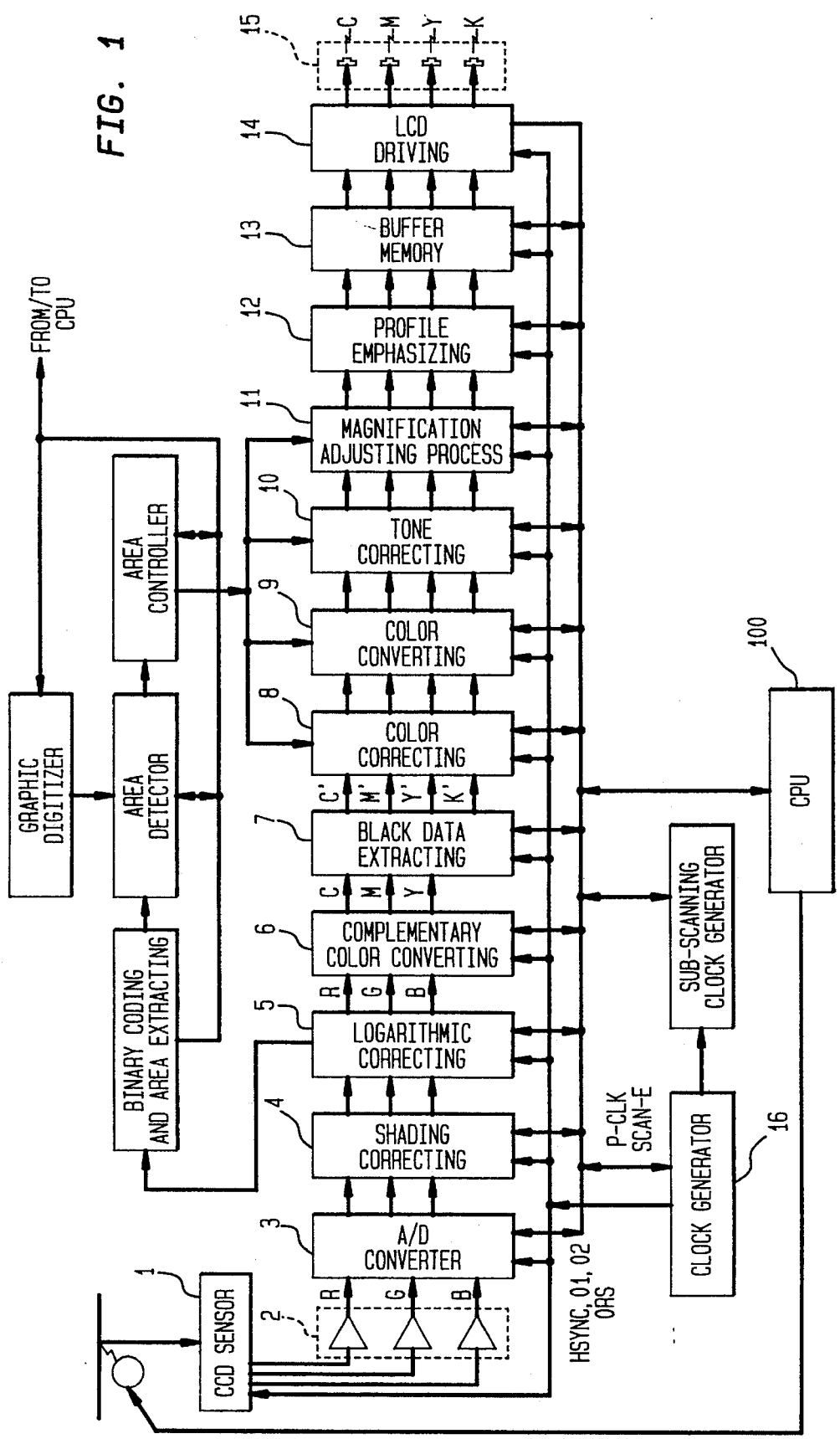
FIG. 1 is a schematic block diagram of an image magnification adjustable system to which the present invention is applied.

FIG. 1 shows a schematic view of a digital copying system employed as an example of an image processing system according to the present invention, which effects given functions between an image input unit and an image output unit to set a reference between a reading resolution of the input unit and an output resolution of the output unit.

Generally, such resolution of the image processing system in a horizontal direction is designated in a unit of DPI (dots per an inch) indicating that the image is processed with the number of pixels of the image contained in one inch, while resolution in a vertical direction is designated in a unit of LPI (line per an inch) indicating the number of lines positioned in one inch. The magnification conversion function according to the present invention is effected to adjust a reference of the resolution between the image input unit and the image output unit. To this end, the resolution of the input and output units must be previously determined. For example, assuming that the resolution of the input unit is 200 dpi×200 lpi and that of the output unit is 400 dpi×400 lpi, if the input image is outputted as is, then an image which is reduced by 50% in horizontal and vertical directions is obtained. At this time, in order to equally match the input original image to the copied image in size without any change in magnification, the image data inputted must be subjected to a line density variation which is referred to as a scaling for setting the image to be at 200% in the horizontal and vertical directions, respectively. Where the resolution of the line density variation output unit is identically set, the magnification is not varied.

Moreover, in order to correspond the size of the original and that of the copy at a ratio of 1:1, the image data must be outputted as it is without any variation of the line density. In brief, the variation of a specified resolution of the image data read by the input unit to a desired arbitrary resolution is referred to as the line density variation or scaling, and the magnification adjustment or magnification conversion is referred to as a general process conception to change a size of the image (by appropriately using the scaling function) in consideration of the resolution of the input unit and output unit.

The description of the present invention will be made under the condition that the resolution of the input unit is equal to that of the output unit. Even if the above-mentioned condition of the present invention is not established, no technical difference is present while difference of magnification is present. Accordingly, in the present invention it should be noted that the condition is defined for convenience sake.

Figure 2:
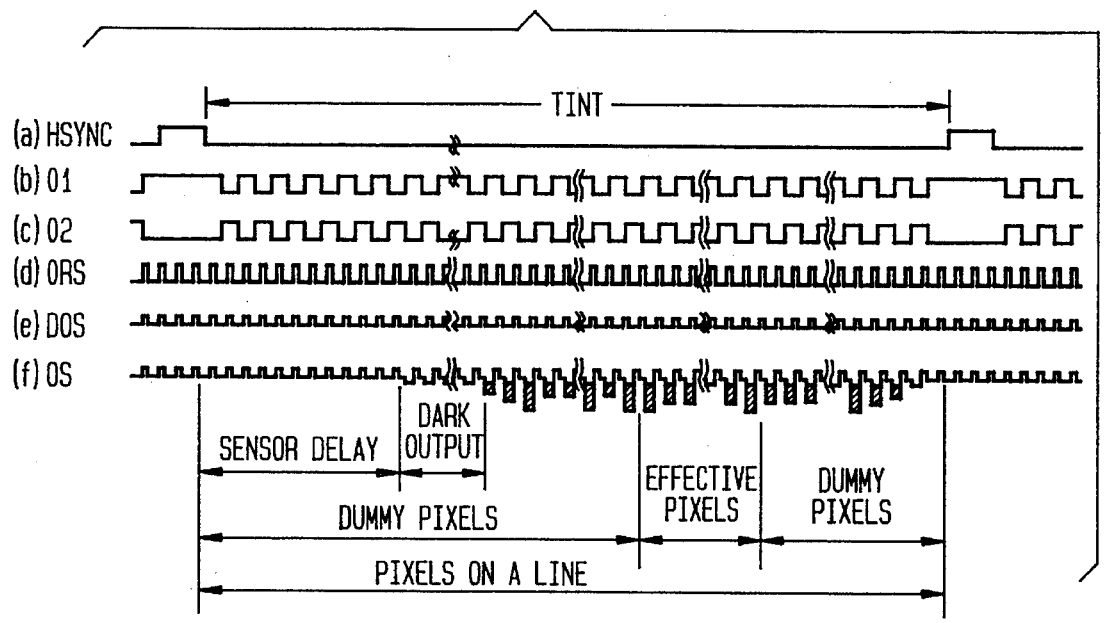
FIG. 2 shows waveforms with control input signals and output signals of a CCD image sensor.

Referring to FIG. 1, reference numeral 1 denotes a CCD sensor which converts the original image to electric signals by using a HSYNC signal (see (a) in FIG. 2) for controlling the exposure time, shift clocks 02 (see (b) and (c) in FIG. 2) for controlling the discharge of stored electric charges for an analog shift register (not shown) employed in the sensor, and a control input signal ORS (see (d) in FIG. 2) for resetting each of the photo cells in the sensor 1. The sensor 1 produces two kinds of signals, that is, one is a dummy output signal (DOS) (see (e) in FIG. 2) and the other is an image output signal (OS) see (f) in FIG. 2). The DOS is a signal related to an electrical characteristic of the sensor 1, and is generated by providing the ORS signal which resets the photo cells in the sensor 1 and is produced by mixing with the image data. therefore, when the DOS component is subtracted from the OS component, that is, as reset noise is removed, it is possible to obtain the actual image signals.

The image output signals of the sensor 1 proportionally react to an amount of light irradiated to the sensor 1 and can be generally expressed as the following equation:

$$Vos = \alpha \cdot Is \cdot Tint(v)$$

where, e denotes a sensitivity factor, Is denotes strength of the light irradiated to the sensor 1 or density of luminous flux which is expressed in terms of lux, and Tint denotes the exposure time (sec).

When the amount of the irradiated light and the exposure time are set to be above a predetermined level, the sensor 1 is set to be in a saturated condition at which a saturation voltage Vsat is produced from the sensor 1. Meanwhile even if no light is irradiated to the sensor 1, an offset voltage having a constant level which is referred to as a dark output voltage $VD_{DRK}$ is produced from the sensor 1. Accordingly, the output range $V_{OS}$ of the sensor 1 is defined as:

$$Vsat \geq Vos \geq Vdrk$$

And, the operating voltage $v_{DYNA}$ of the sensor 1 is set as:

$$Vdyna = Vsat - Vdrk$$

As the operation range of the sensor 1 is widened, the sensor 1 reacts to the light of an extended range which exerts to decide a quality of the input image. For this reason, it is required to extend the operation range of the sensor 1 as much as possible in order to enable the sensor 1 to react to the fine variation of the light in strength.

The exposure time Tint serves as an important factor that affects the sensor operating voltage in view of the structure of the sensor 1. For example, if the number of pixels per line is set to n, the time is defined such that the sensor 1 can read the n pixels during a period of HSYNC (at an interval of Tint) and then be reset after the reading. This function can be achieved by using the sensor control signal ORS. If the sensor 1 operates by using the ORS below frequency n per a period of HSYNC, then the previously input image is not clear but stored to be produced as a visual persistence or after image. Therefore, the exposure time Tint is set to satisfy the following condition:

$$Tint \geq 1/f_{\phi RS} \times n = 1/f_{\phi RS} \times (n_R + n_D)$$

where, $f_{\phi RS}$ denotes a sensor driving frequency, n denotes the number of pixels on one line read out by the sensor 1, denotes the number of substantially effective pixels and denotes the number of dummy pixels previously set for every sensor.

For this reason the kind of lighting source, lighting efficiency of the lens and the exposure time must be properly decided in the photoelectric transducer means. The exposure time Tint is substantially controlled by using the exposure time controlling signal HYSNC but must be properly decided upon in consideration of the optical requirements and operational characteristics of the sensor 1, as mentioned above. Also, the time Tint is referred to as the time required to scan one line by way of the sensor 1, which time must be short in order to increase the speed of the whole system performance.

Further, the exposure time controlling signal HSYNC is an important signal essentially needed to maintain the line synchronism of the system.

Referring to FIG. 1, reference numeral 2 denotes an amplified having an amplification factor "A" satisfying a condition that $V_{AD} = A \cdot Vos$ (Where Vos denotes the output range of the sensor 1) when the range of the operating voltage of an analog to digital (A/D) converter 3 connected thereto is set to $V_{AD}$.

To increase the speed of the system, the time Tint is preferably set to be short. In addition, the lighting efficiency of the lens and reflecting mirror is relatively low, so the output voltage of the sensor 1 is lower than the operational range $V_{AV}$ of the A/D converter 3 by several one hundredths. For this reason, the amplifier 2 is an essential element in the system. The A/D converter 3 serves to convert the analog image signals transferred from the previously positioned amplifier 2 into digital signals.

Figure 3:
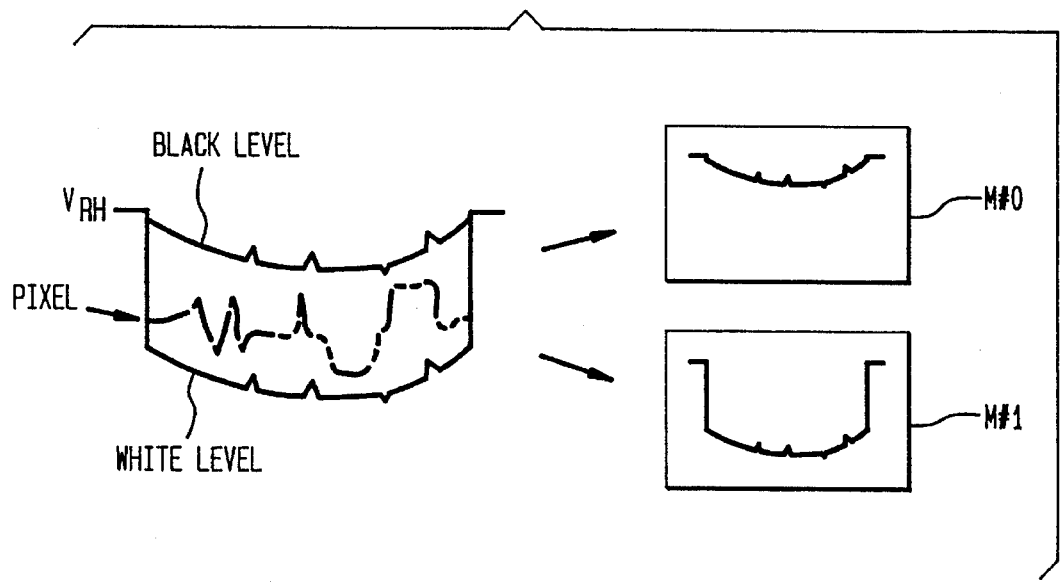
FIG. 3 illustrates a course of producing black level reference data and white level reference data.
Figure 4:
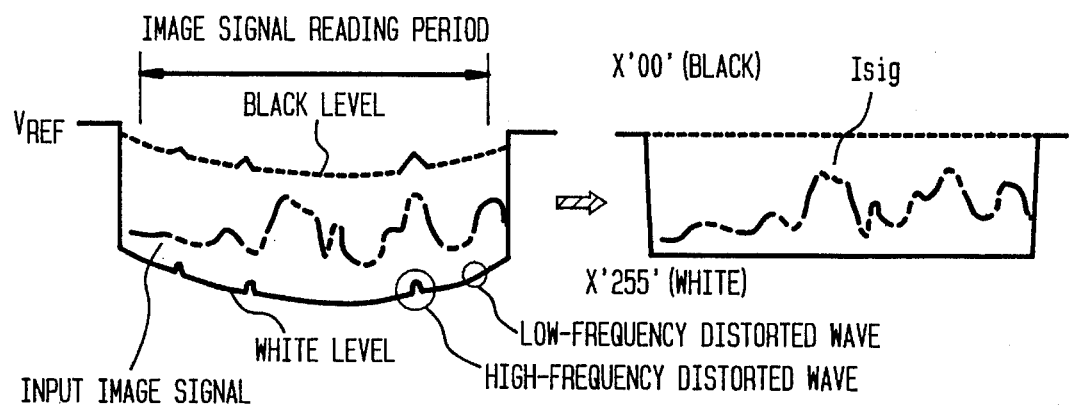
FIG. 4 illustrates the principle of shading correction.

In FIG. 1, reference numeral 4 denotes a component for correcting the shading which has occurred due to variation of brightness of the lighting source related to the position. For example, in the case of a fluorescent lamp, the lighting density of an electrode (filament) is relatively low while midway along the lamp the density is relatively high, so such shading has occurred. For that reason, the input document is generally darker at the ends than the midway thereof, so the quality of the image is deteriorated considerably. FIGS. 3 and 4 illustrate the principle for correcting the shading, which will be described later. The shading correcting portion 4 serves to correct the non-uniformity of "black level" and "white level" which occurred according to the position of the lighting source. More specifically, the shading correcting portion 4 reads the black level and white level values prior to the reading of the original image from the sensor 1, and then corrects the shading in accordance with the position of the lighting source by using the level values at the time of the reading of the image.

FIG. 3 illustrates a course of producing the black level reference value and white level reference value wherein the data inputted from the sensor 1 under a turn-off of the lamp is stored into an exclusive memory MO as the white level reference data, while the image data from the white level reference value prepared under a turn-on of the fluorescent lamp is stored into an exclusive memory MI as the white level reference data.

FIG. 4 illustrates a course for correcting the image data presently read out from the sensor 1 in accordance with the position of the lighting source on the basis of the black level reference value and white level reference value as shown in FIG. 3.

Assuming that the present image data value is Icur (X), the white level reference value is Iwht (X), and the black level reference value $I_{BLK}(x)$, and these values are quantized, the value of the corrected data can be expressed as the following equation:

$$Isig(x) = Icur(x) - I_{BLK}(x)/Iwht(x) \times 256$$

where, X denotes a position in the horizontal direction on the same scanning line.

In FIG. 1, reference numeral 5 denotes a logarithmic correcting portion. The light reflected from the surface of the original is converted to electric signals through the photosensor such as the CCD sensor 1. In this case, the degree of reflection γ on the original surface is defined as:

γ=strength of reflected light/strength of incidental light and, the density D of the reflected light can be expressed as:

$$D = \log (1/\gamma)$$

Figure 5:
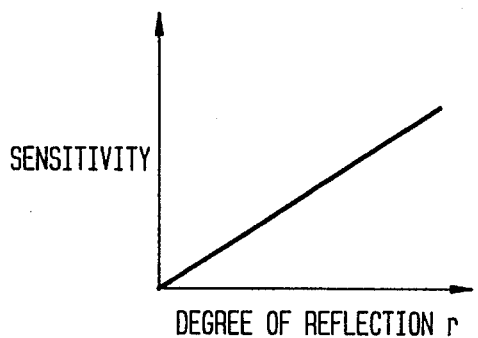
FIG. 5 is a graph illustrating the characteristics between the degree of reflection and the sensitivity of a sensing element.
Figure 6:
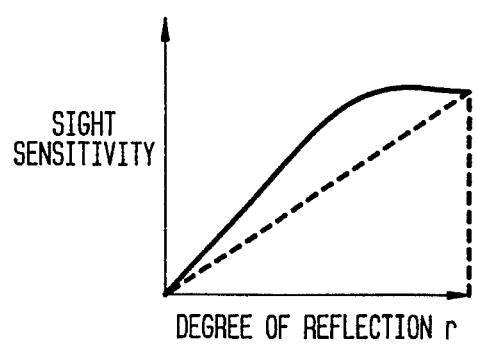
FIG. 6 is a graph illustrating the characteristics between the degree of reflection and the sense of human sight.
Figure 7:
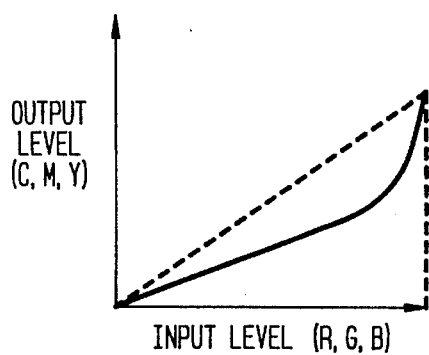
FIG. 7 is a view illustrating the principle of a logarithmic correction.

In general, the photosensor such as a CCD sensor linearly reacts on the degree γ of the reflection as shown in FIG. 5 while human sight shows approximately linear reaction on the density of the reflected light. In other words, the photosensor logarithmically reacts on the degree of the reflection. The logarithmic correcting portion 5 serves to properly correct the difference between the reaction property of the photosensor and the sense property of the human so as to obtain the higher quality of the image.

Referring again to FIG. 1, reference numeral 6 denotes a complementary color converting n portion. The photosensor generally analyzes and reads the light reflected from the original into three color wavelengths. More specifically, the photosensor reads the input image data in three primary colors, that is, Red (R), Green (G) and Blue (B). In order to print the color image of three primary light components sensed by the photosensor, the complementary color conversion is executed to obtain three primary colors of Cyan (C), Magenta (M) and Yellow (Y).

Figure 8:
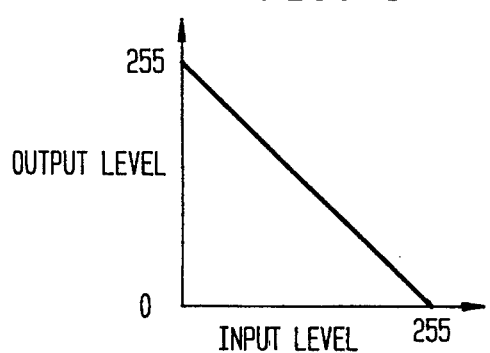
FIG. 8 is a view illustrating the principle of a complementary color conversion.
Figure 9:
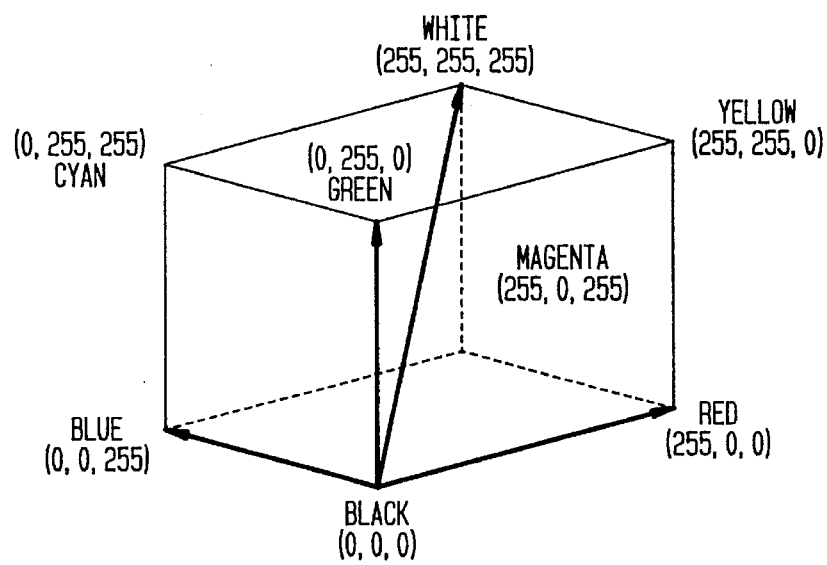
FIG. 9 is a view showing a primary color (R, G, B) hexahedron.

FIG. 8 illustrates a conception that the color image is converted into C, M and Y by way of the complementary color conversion according to the values of R, G and B, and FIG. 9 shows a color co-ordinate system modelled in a form of R G B color hexahedron and illustrating a relationship with the C, M and Y components. In FIG. 9, an origin of the co-ordinate system is set to black (B) in color while an end of the co-ordinate system is set to white (W) in color, wherein the minimum value of each of R G B colors is set to be zero and the maximum value t hereof is set to be 255. As seen from FIG. 9, the values of each color on the co-ordinate system are defined depending on a degree of contribution of the R G B color components with reference to the black origin. In FIG. 9, the additive color mix can be established as:

Cyan=Blue+Green

Yellow=Green+Red

Magenta=Blue+Red

White=Red+Blue+Green

Black=Cyan+Magenta+Yellow

Moreover, the conversion of the R G B colors to the C M Y colors can be expressed as the following formulation model:

$$\begin{bmatrix} C \\ M \\ Y \end{bmatrix} = \begin{bmatrix} 1 \\ 1 \\ 1 \end{bmatrix} - \begin{bmatrix} R \\ G \\ B \end{bmatrix}$$

where, 1 denotes reference white and C denotes a component in which R component is subtracted from the reference white, that is, a complementary color of R.

Figure 11:
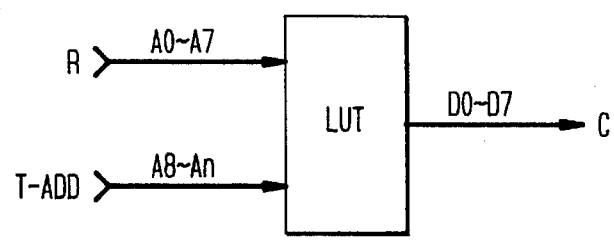
FIG. 11 is a view showing a construction of a complementary color converting circuit in FIG. 1.
Figure 12:
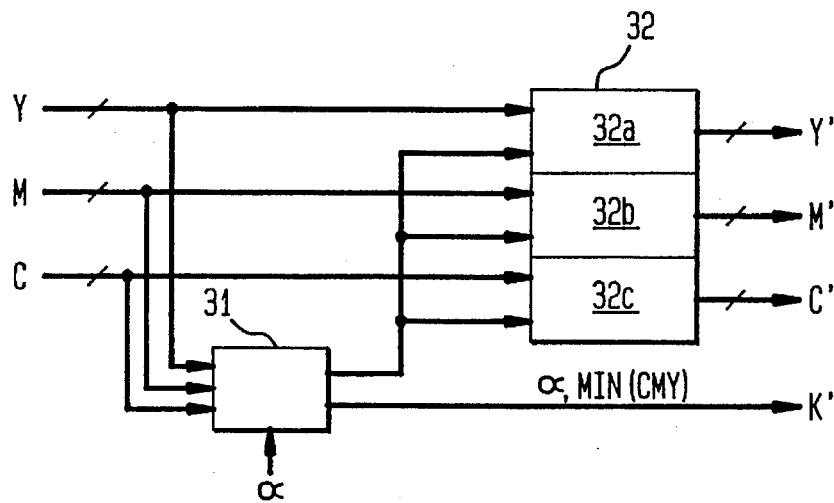
FIG. 12 is a view showing a construction of black data extracting circuit shown in FIG. 1.

From the above-mentioned relation, the complementary color converting portion 6 is composed of a look-up table LUT as shown in FIG. 11.

Figures 10A, 10B, 10C:
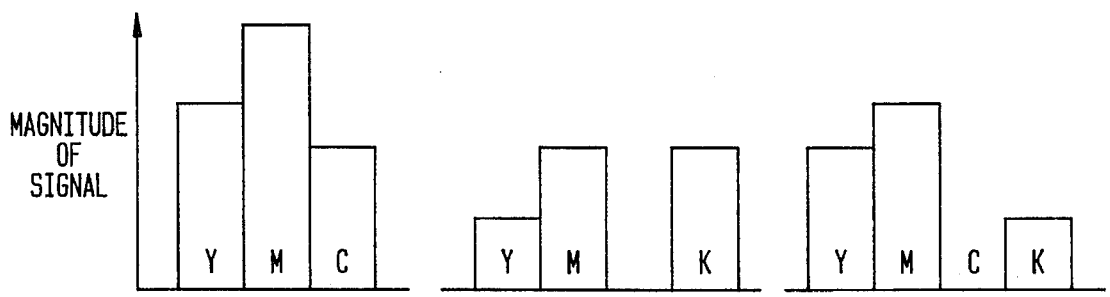
FIGS. 10a–10c are views illustrating an under color removal conception employed in the present invention.

In FIG. 1, reference numeral 7 denotes a black data extracting portion of which the primary object is summarized below. Firstly, the black component can be obtained in theory by mixing the C, M and Y. But, in fact, the black color data obtained by mixing the C, M and Y dyes is deteriorated in quality as compared with the back color obtained by using the black dye. For this reason, the black data extracting portion 7 serves to extract the black component commonly contained in the C, M and Y components and separately process (or print) the extracted black component as the black dye in order to improve the quality of the image. Secondly, although three C M Y color dyes are required to reproduce the black color, the black data extracting portion 7 serves to extract only the black component and prints amounts of the common dye by using the single black color dye, with a result that the consumption of the dyes is economically reduced. The method of extracting the signal components consisting of the black component from the three color signals and substituting the extracted signal components by the black signal is referred to as so-called "under color removal (UCR)". If an amount of the UCR is defined as K, then K can be obtained by the following equation:

$$K = \min(Y, M, C)$$

where, min (Y, M, C) denotes the minimum values of the Y, M and C color components (FIGS. 10a–10c).

The C, M and Y colors inputted to the black data extracting portion 7 after the extraction of the black component are converted and processed as below:

$$\begin{bmatrix} Y' \\ M' \\ C' \end{bmatrix} = \begin{bmatrix} Y \\ M \\ C \end{bmatrix} - \alpha K$$

where, $\alpha$ denotes a black extraction factor of which the value is given as shown in FIG. 10.

More specifically FIG. 10 (a) shows magnitude of each signal component of an arbitrary primary color defined by mixing three Y·M·C colors, (b) illustrates a method of executing the UCR process ($\alpha=1$) for the primary color at a ratio of 100% or less, in case that the black extraction factor $\alpha<1$. In these methods, a constant amount of the signal component having the lowest graduation among the C, M and Y components is applied to the process for the primary color.

When the process illustrated in FIG. 10 (b) is substantially executed, the reproduction of the color may be achieved by the Y and M signal components and the black component, but it can be considered that an amount of the UCR is set to be at a ration of 100% or less than, or $\alpha<1$, that is, the UCR is lower than the color having the lowest gradation among the three color signals so that the reproduction of the color can be executed by using four signals as, for example the above-mentioned three color signals and the black signal.

The black data extracting portion 7 which executes the UCR process comprises a comparator 31 and a subtracter 32.

In FIG. 1, reference numeral 8 denotes a color correcting portion. The color image processing system analyzes the color image into the three primary signals (R, G, B) by using a color filter and reproduces the color by using the dyes of the C, M and Y components, which are complementary colors of the R, G and B colors, and the dye of the K component. For example, when the color image is ready by the system, if the spectrum curves of the R G B color filters are overlaid, then the color components may be undesirably absorbed and transmitted to colors. Moreover, the spectrum characteristic of the dyes in the output unit of the system is undesirably deteriorated similarly to the input unit. The color correcting portion 8 is employed to properly process the problem which occurred for the above-mentioned reasons at the time of the color reproduction.

A color converting portion designated at 9 in FIG. 1 serves to convert the specified color of the original into colors needed by a user instead of the reproduction of the color similar to the original image color.

Figure 13:
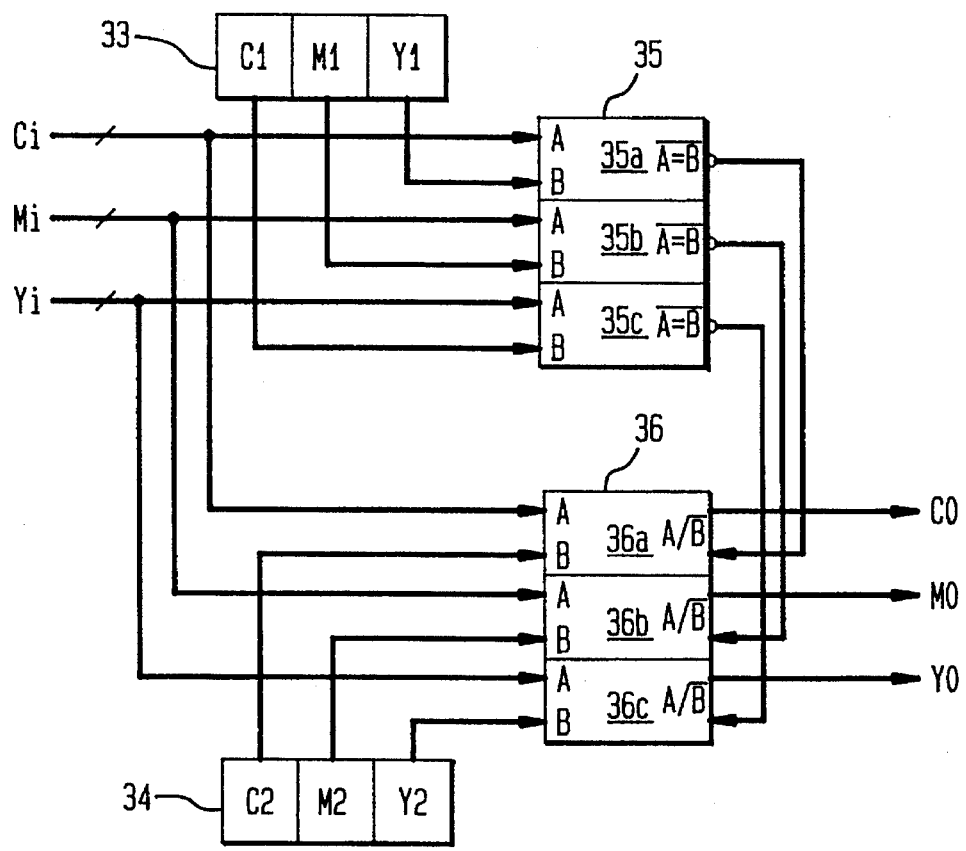
FIG. 13 is a circuit diagram of a color converting circuit showing in FIG. 1.

Referring to FIG. 13, there is shown a block diagram of the color converting portion 9.

Assume that the arbitrary color composed of the C, M and Y components having the ratio of $C_1, M_1, Y_1$ is set to $I_1$ ($C_1, M_1, Y_1$) and the color needed by the user is set to $I_2$ ($C_2, M_2, Y_2$).

Then, a CPU (designated at 100 in FIG. 1) executes an initial operation for registering the color values ($C_1, M_1, Y_1$) to be converted into a non-converting color register 33 and registering the converted reference color values ($C_2, M_2, Y_2$) into a converted color register 34. After the initial operation, a comparator 35 compares the value ($C_1, M_1, Y_1$) and the input data (Ci, Mi, Yi) to determine the identity therebetween. If the identity is determined, a selecting circuit 36 outputs values $C_2, M_2, Y_2$ instead of values Ci Mi and Yi through a control terminal A/B thereof. Alternatively, if the identity is not determined, then the input values Ci, Mi and Yi are outputted to execute the color conversion process.

The process function of the color converting portion 9 can be expressed in algorithmic form as:

$$\begin{aligned}
C_o &= C_2, \text{ if } C_i = C_1 \\
&= C_i, \text{ else} \\
M_o &= M_2, \text{ if } M_i = M_1 \\
&= M_i, \text{ else} \\
Y_o &= Y_2, \text{ if } Y_i = Y_1 \\
&= Y_i, \text{ else}
\end{aligned}$$

In FIG. 1, reference numeral 10 denotes a tone correcting portion which adjusts a tone of each of the colors C, M Y and K. The tone correcting portion 10 reduces the tone of the specified color so as to improve the visual efficiency of the copy image even that of the original image, or to deeply or lightly adjust the tone of the image.

In FIG. 1, reference numeral 11 denotes a magnification adjusting portion which executes the magnification conversion operation for enlarging or reducing the size of the original image in such a manner that magnification of the image is adjusted to the same or differential ratio in the horizontal and vertical directions to thereby assure a predetermined size of the copy image.

The magnification adjusting operation is classified into a magnification process in the horizontal direction (that is, main-scanning direction) and a magnification process in the vertical direction (that is, sub-scanning direction). The magnification adjusting process in the main-scanning direction is referred to as an image processing function related to the CCD image sensor, while the magnification adjusting process in the sub-scanning direction is referred to as a control function related to the image reading position of the CCD imaging sensor.

Generally, the magnification conversion in the main- and sub-scanning directions must be controlled at the same ratio. Also, the magnification ratios of different original documents must be separately established in order to provide the condition of the copy needed by a user and to maximize a user's convenience. It should be noted that a meaning in which the magnification ratios in the main- and sub-scanning directions are separately established contains a possibility of the magnification adjusting process at the same ratio, and is identified on the basis of the magnification ratio setting method.

Such a principle of the magnification conversion is illustrated in FIGS. 14a–14e. More specifically, the magnification conversion of the image data in a digital circuit is related to the data matching condition in that n pixels correspond to N pixels with the magnification ratio established as:

the magnification ratio=$N/n \times 100(\%)$

Figure 14A:
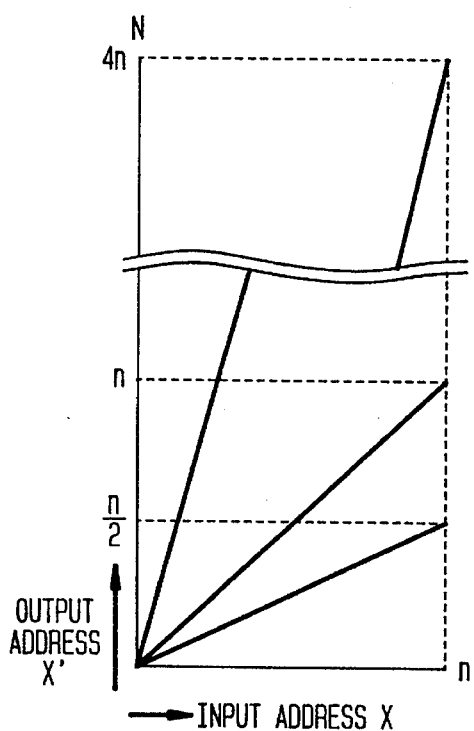
FIGS. 14a–14e are views illustrating the principle of magnification conversation according to the present invention.
Figure 14B:
Figure 14C:
Figure 14D:
Figure 14E:
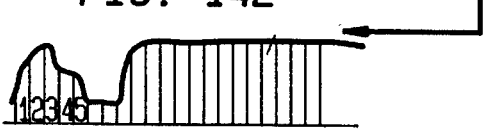

In FIG. 14(a), it is shown that when the n input pixels correspond to the relation of N-n/2, the magnification is adjusted at a ratio of 50%, that is, a reduction of ½. Alternatively, when the pixels correspond to the relation of N=4n, the magnification is adjusted to be enlarged by a ratio of 400%. Where the pixels n and N are matched in a relation of positive number, the magnification process can be easily achieved. It is required that the magnification must be controlled within a range of 100% to several 100% in a unit of 1%, so it is difficult to achieve the magnification conversion in a unit of 1%.

According to the present invention, it is possible to reduce the difficulty related to the magnification process in a unit of 1% as called for in the following description taken with the reference to a case where the magnification is adjusted between ranges of 50% and 400% in a unit of 1%.

As shown in FIG. 14(a) the inclination in a case that n input pixels (or input lines) are matched to N pixels (or output lines) is set to be N/n×100(%).

According to the magnification process of the present invention, the values of n and N are not substantially designated while the magnification ratio is designated so that the input pixels (or input lines) are changed into the output pixels (or output lines) of a predetermined number N corresponding to the designated magnification ratio. The value of n is decided depending upon the size (horizontal and vertical length) or the area of the original document to be scanned and the line density, which is formulated as:

$$N = K \cdot n$$

where, N denotes the number of the output pixels (or output lines), K denotes the magnification ratio and n denotes the number of the input pixels (or input lines).

At this time, since the processing co-ordinate is expressed in digital or discrete, it requires artificial insertion or omission of the specified pixels in accordance with the magnification ration in order to execute the magnification conversion.

That is, in case of magnification conversion of 53%, every one hundred input pixels (or input lines) are changed to fifty three output pixels (or input lines) in number. In this case, to prevent geometric distortion of the image, the pixels must be omitted at regular intervals without a partial omission of the pixels at the specified positions. For this reason, in the magnification process of the digital image, a calculation of the position (address) is first needed to insert or omit the pixels (or lines) at regular intervals on the basis of the magnification ratio.

FIGS. 14(b) to (e) illustrate the address designation of the output signals to the input signals according to the magnification ratio. As seen from the drawings, in case of the enlargement of the image (see FIG. 14(d), data is inserted to a predetermined position of a buffer memory (see FIG. 14(c)) at a constant ratio (that is, according to the magnification ratio) in correspondence to the input pixels (or input lines) (see FIG. 14 (b)). In the case of reduction of the image (see FIG. 14(e)), data located at the predetermined position of the buffer memory is omitted.

Figure 15A:
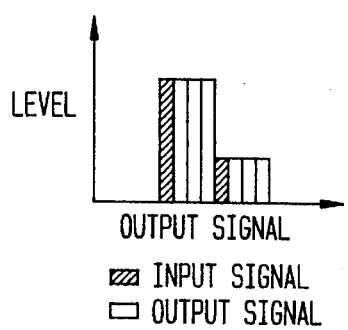
FIGS. 15a–15c are views illustrating an interpolation method employed in the present invention.
Figure 15B:
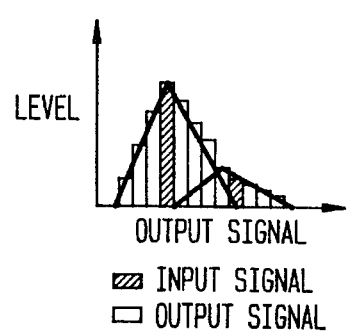
Figure 15C:
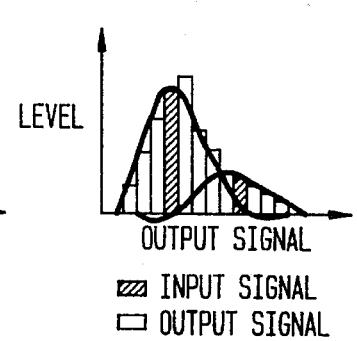

The insertion of data can be executed by way of an interpolation method that is achieved by a repeated arrangement of the preceding pixels and a method of producing the values of pixels (or lines) to be newly inserted on the ground of the average or other statistical data of adjacent pixels (or lines). FIGS. 15a–15c show several examples of the interpolation method in which (a) shows the nearest repeating interpolation method, 15(b) shows a linear interpolation method and 15(c) shows a curve interpolation method.

As known in FIGS. 14 and 15, the magnification adjustable portion is generally divided into a processing portion which executes the operation related to the designation of the address needed to process the output data (output pixels or output lines) in accordance with the magnification ratio of the input data signal (input pixels or input lines), and a processing portion which produces the signal level values of the position (or address) to be subjected to the insertion or omission of data in accordance with the desired magnification.

The magnification conversions in the horizontal and vertical directions are equal in principle but different for practical application. More specifically, in the horizontal magnification process, the number of pixels on one line is previously set, so the magnification conversion (or variation) process is executed in such a way that pixel data output from the buffer memory (see FIG. 14 (b)) is inserted or omitted in accordance with the magnification ratio, as shown in FIGS. 14(a) and (b). The vertical magnification process is established by way of two magnification processing methods which are similar in principle. The one-dimension sensor is employed as a sensor for producing the pixel data, so the vertical magnification conversion is related to the control of the reading position of the sensor. That is, the vertical magnification is related to the control of the reading position (that is, re solution of the movement) of the sensor in the sub-scanning direction. For example, when the magnification is adjusted at the ration of 100% in 400 LPI, the control is executed in such a way that the scanning position in the sub-scanning direction is shifted by 1/400 inch. When the magnification is adjusted at the ratio of 200%, the control is executed in such a way that the scanning is established while shifting the write scanning position by 1/800 inch.

Accordingly, as the scanning position of the sensor in the sub-scanning direction is accurately controlled in accordance with the magnification ratio, the vertical magnification process can be completely achieved by way of a position control means. In such a system, the horizontal magnification ration of the main-scanning direction is carried out on the basis of the principle of the magnification conversion illustrated in FIG. 14, while the vertical magnification of the sub-scanning direction can be adjusted by controlling the position of the sensor. It is difficult for the position of the sensor to be finely controlled within a range of 50% to 400% in a unit of 1% because a stepping motor is conventionally employed in a sensor positioning means to achieve the accurate position control of the sensor and a stepping angle of the motor must be matched in a unit of 1%. Therefore, when a motor driving device (that is, a gear device) which is accommodated by the unit stepping angle of the motor is practically fabricated, the device is of increased size with a result that the speed of the device is deteriorated. For this reason, in the conventional image input device, the moving distance of the sensor 1 is fixed to a predetermined value in accordance with the stepping angle of the motor. Also, in the case of the vertical magnification conversion, when the enlargement process is executed in accordance with the magnification ratio under the principle as shown in FIG. 14, the scanning is repeatedly executed on the specified position on the line to be scanned. When the reducing process is executed, the motor is driven so as to remove the specified lines without data practically inputted from the sensor 1. In this case, the principle of the horizontal (main-scanning direction) magnification process and the method therefor are also applied to the vertical (sub-scanning direction) magnification process. At this point, the difference between the horizontal magnification process and the vertical magnification process is that the data inserting or removing position (that is, address) is set to be in a unit of the pixel on the same scanning line in the case of the horizontal magnification variation, while the position is set to be a unit of the line on the same scanning area in the case of the vertical magnification variation.

Referring to FIG. 1, reference numeral 12 denotes a profile (or edge) emphasizing portion which emphasizes a profile (or edge) of the image magnified at the magnification processing portion 11.

The profile-emphasized image signal is stored in the buffer memory 13 and then supplied to LCD driving portion 14 as needed.

DETAILED DESCRIPTION OF A PREFERRED EMBODIMENT

I. Horizontal (main-scanning direction) magnification conversion:

The horizontal magnification conversion is referred to as an operation (or function) related to the output pixel mapping according to the address and the magnification ration of the input pixel a shown in FIG. 14(a). That is, in FIG. 14(a) X' designates the output pixel address, X designates the input pixel address, K designates the magnification ratio (N=K·n), n designates the number of the input pixels per one line, N designates the number of the output pixels per one line, respectively. The values K and n are previously determined on the basis of the selected magnification ratio and the resolution of the image data input device. Since the number N of the input pixel becomes K·n, the term N can be determined from this relation. Accordingly, when the value of the pixel data magnified at the arbitrary position is i' (x), the input pixel is needed to satisfy the following condition in consideration of the relation of the mapping:

$$i'(x)=i(X/K)$$

(where, X=1,N)

In the equation, the process of the input pixel i(X/K) into the value i' (x) can be achieved by way of an interpolation method which is illustrated in FIG. 15.

In the case of the process of the output pixel i' (x), since the term X is sequentially controlled from 1 to Kn, the calculation of the address X/K corresponding to the term X is necessary.

Figure 16:
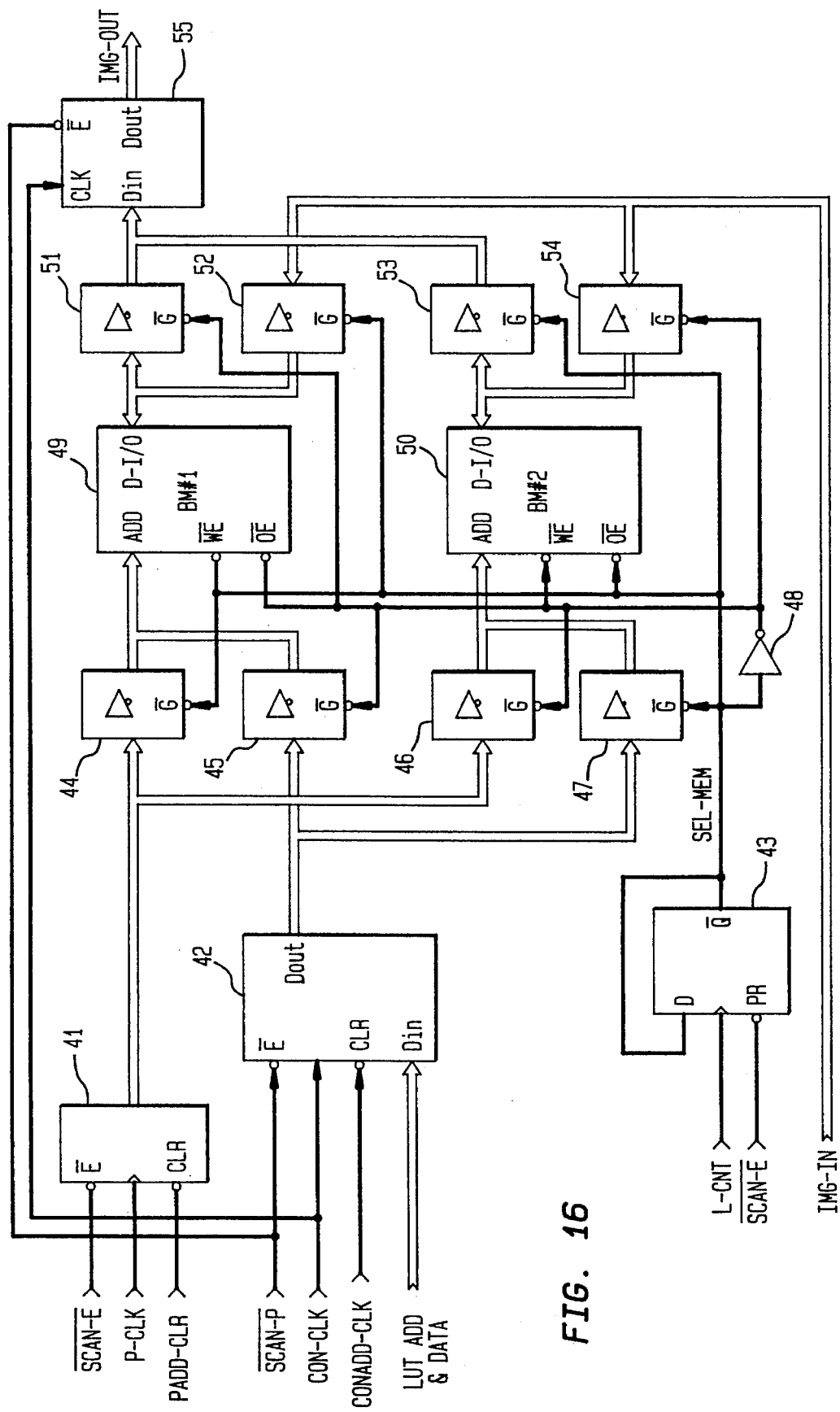
FIG. 16 is a block diagram showing a construction of a horizontal magnification processing circuit shown in FIG. 1.

FIG. 16 shows an entire construction of the horizontal magnification adjustable processing portion. Referring to FIG. 16, a magnification address converter 42 effects the address conversion process according to the magnification conversion as described above, and an image data interpolating circuit 55 effects the image data interpolation process, as described hereinafter.

In FIG. 16, the horizontal magnification adjustable processing portion includes two blocks base on two buffer memories 49 and 50. With this construction, a pipeline process can be established so that the scanned pixel data prior to the magnification conversion process is stored into the buffer memories and, at the same time, the data stored in the buffer memories are read to carry out the magnification conversion so as to effect the process at high speed. That is, the scanned data is stored into the buffer memory 49 while data to be subjected to the magnification process is read from the buffer memory 50. Alternatively, data to be sequentially processed is read from the buffer memory 49 and subjected to the magnification process while the sequentially scanned data is stored into the buffer memory 50. This operation can be controlled by a buffer selector 43 which is controlled by a signa L-CNT provided from a CPU 100 in FIG. 1. More specifically, the CPU 100 produces the signal L-CNT designating the start of the scanning on a new line to maintain the scanning synchronism in the horizontal direction. The signal L-CNT must be synchronized with the signal HSYNC. Accordingly, the buffer selector 43 divides the L-CNT by ½ and effects the control in such a way that the buffers 44 and 52 are enabled to store the scanned data to the buffer memory 49 and, simultaneously, the buffers 47 and 53 are enabled to read the data from the memory 50 so as to process the magnification conversion under odd divided signal L-CNT. The buffer selector 43 also performs the operation opposed to the above-mentioned process under even divided signal L-CNT.

As a result, the process of storing new data in the buffer memory 49 or 50 and the process of reading the data to be magnified from the buffer memory 50 or 49 are simultaneously effected to thereby increase the data processing rate.

Figure 17:
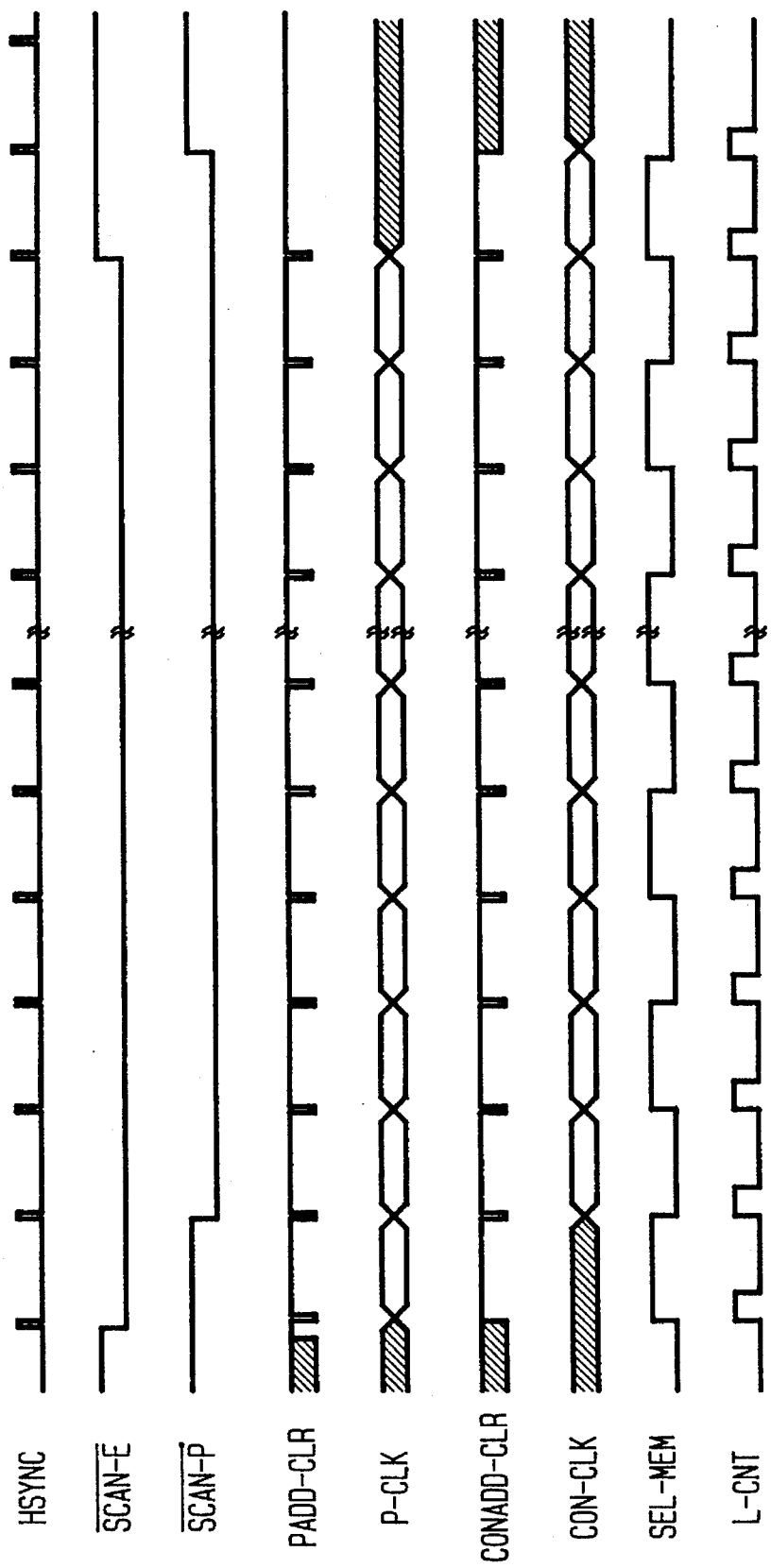
FIG. 17 shows waveforms of control signals for processing the horizontal magnification achieved by the circuit shown in FIG. 16.

FIG. 17 shows waveforms of main control signals of the horizontal magnification adjustable circuit shown in FIG. 16. Referring to FIG. 17, the signal HSYNC as a signal for determining a period of exposure time is produced by the clock generator 16 in FIG. 1, and the signal SCAN-E, which is a signal designating effectiveness of data obtained from the sensor 1 every period (time required for producing one line data or time required for scanning one line) of the signa HSYNC, is activated when the scanning for a new line is started by using the signal L-CNT provided from the CPU (100).

The signal SCAN-E serves as a signal for controlling an image storing address generator 41 in FIG. 16 to store new image data into the buffer memories 49 and 50 in FIG. 16.

In FIG. 17, a signal SCAN-P serves as a signal for controlling the magnification variation address converting circuit 42 and generally is delayed from the signals SCAN-E and HSYNC by one period because the scanned data is first stored into the buffer memory 49 or 50 and the data storage and magnification process are then effected with intervals delayed by an amount of one scanning line.

A signal PADD-CLR serves as a clear control signal for clearing the image storing address generator 41 and clears a preset value of the address generator 41 to b 0 to store new line data. A signal CONADD-CLR denotes a clear signal for the magnification variation address converting circuit 42 and clears the preset value of the magnification variation address generator to be 0 just before the process of new line data after the magnification process for one line.

Further, signal P-CLK serves as a pixel clock signal informing the store of the pixel data ING-IN to the buffer memory 49 or 50, which is activated every one byte to maintain the synchronism of the pixels of the same scanning line.

The image storing address generator 41 in FIG. 16 counts the signal P-CLK to product the address.

In FIG. 17, a signal CON-CLK, which is a control signal for the magnification variation address converting circuit 42, executes the control for maintaining the pixel synchronism of the image data to be magnified and serves as a basic signal for controlling the reading of data from the buffer memory 49 or 50.

Figure 18:
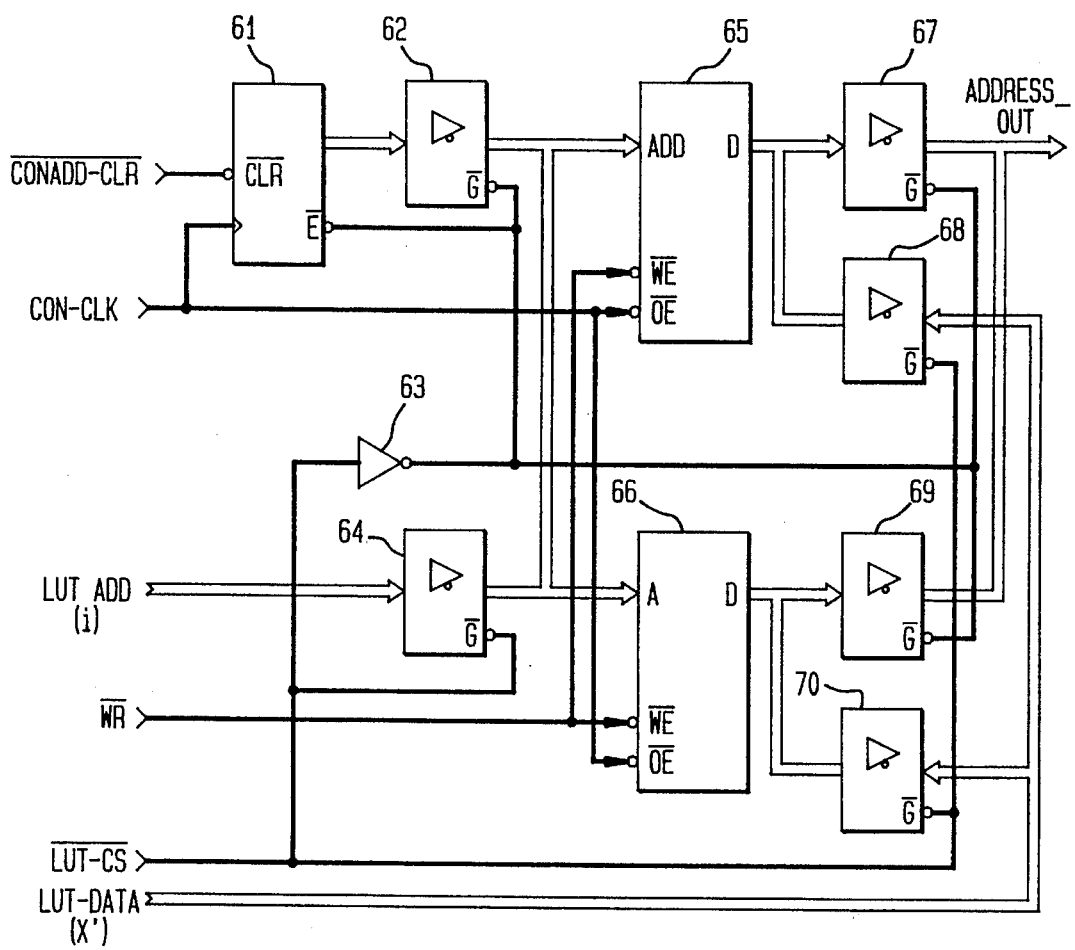
FIG. 18 is a block diagram of a magnification address generator constructed by using a look-up table.
Figure 19:
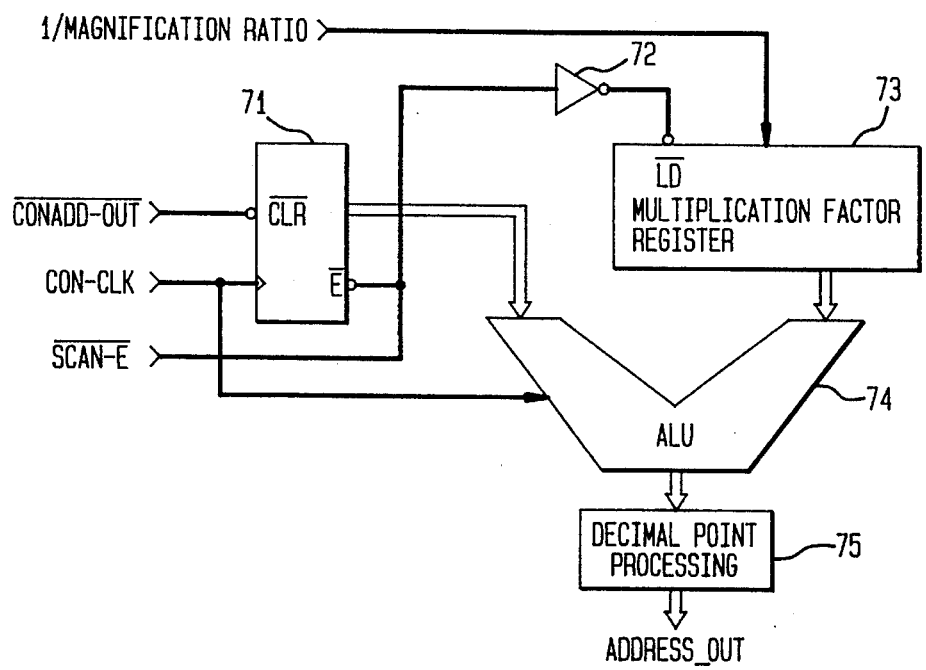
FIG. 19 is a block diagram of a magnification address generator constructed by using an ALU.

The construction of the magnification variation address converting circuit 42 shown in FIG. 16 will be described with reference to FIGS. 18 and 19. FIG. 18 shows an example of the circuit 42 constructed by embodying a look-up table which is referred to as "LUT". FIG. 19 shows another example of the circuit 42 constructed by using an arithmetic logic unit which is referred to as "ALU". The basic operation of the examples of the circuit 42 shown in FIGS. 18 and 19 are substantially similar to each other. That is, the circuit 42 in FIG. 18 is designed such that the address related to the pixel data to be read from the buffer memory 49 or 50 in synchronous to the magnification verifying clock CON-CLK is previously calculated by the CPU 100 in consideration to the magnification ratio according to the relation shown in FIG. 14(a). The calculated address is previously stored in the LUT in order to produce the magnification adjusting address on the basis of the address stored in the LUT. Alternatively, the circuit 42 shown in FIG. 19 is designed such that the address obtained from the clock CON-CLK and the address for reading the buffer memory are calculated separately for every reading of the pixel data on the basis of the principle illustrated in FIG. 14 so as to convert the address.

With the construction of the circuit 42 shown in FIG. 19, there is an advantage in that no buffer memories 65 and 66 for storing the LUT are employed therein because of the ALU.

The examples of the circuit 42 shown in FIGS. 18 and 19 are different in construction but the same in operation.

The main-scanning magnification converting LUT circuit is composed of two memories 65 and 66 which store the address table values of several bytes to assist the address corresponding to the number of the scanned pixels on one line. That is, a first LUT storing memory 65 is employed to store the lower byte conversion address while a second LUT storing memory 66 is employed to store the higher byte conversion address.

Moreover, in FIG. 18 the buffers 64, 68 and 70 are employed to store the address for the magnification conversion in the main-scanning direction into the memories 65 and 66 prior to the actual magnification converting process of the image data, and controlled by a signal LUT-CS provided from the CPU 100.

Figure 20A:
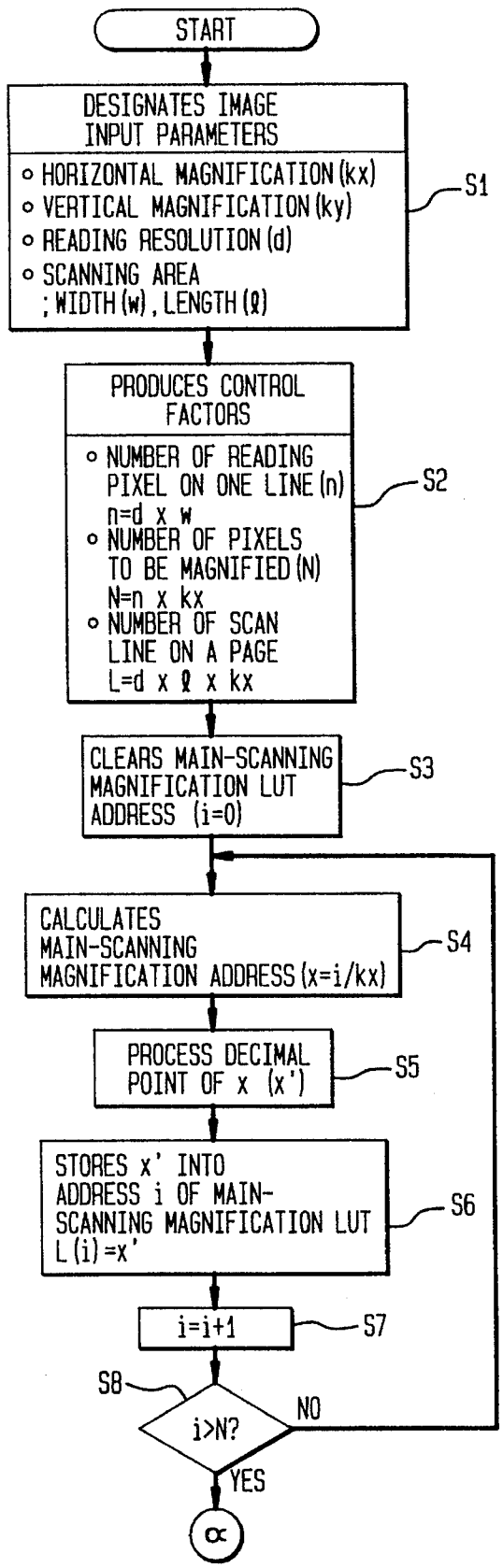
FIGS. 20a–20c are flow charts illustrating a magnification processing operation according to the present invention.

The operation of scheduling the LUT for producing the magnification conversion address in the main-scanning direction will be described in detail with reference to FIG. 20(a).

First, when the magnification ratio of the copy to the original image is determined prior to the scheduling of the LUT for the horizontal and vertical magnification conversion to obtain the magnification conversion address, the CPU 100 effects a pre-process for designating the image input parameters and calculating the control factors (S1 and S2).

In the step of designation of the image input parameters, the horizontal magnification ratio Kx, the vertical magnification ration Ky, the reading resolution d and the size (W×l) of the scanning area are determined effectively. Also, in the step of calculating the control factors, the number n of the reading pixels on the specified line, the number N of the pixel to be magnified on one line and the number L of the scanning line on one page are determined from the parameters obtained in the step of designating the parameters.

After the pre-process, the CPU 100 schedules the LUT for producing the magnification conversion address of the horizontal scanning direction. More specifically, the CPU 100 clears the LUT address for the magnification conversion of the main-scanning direction and thus increases the LUT address i by 1. Then, the CPU 100 divides the increased LUT address i increased by the horizontal magnification ratio Kx to calculate the main-scanning magnification conversion address X and then raises to unit fractions not lower than 5. The obtained result is stored in the address i of the memory for the main-scanning magnification conversion LUT (S4 to S7).

When the LUT address i is larger than the number N of the pixels to be magnified on one line, the step of producing the vertical (sub-scanning) magnification conversion address is executed. Alternatively, when the LUT address i is smaller than the number N of pixels, the control is returned to the step S4 to repeat the Steps S4 to S7 until the address is obtained (S8).

Figure 20B:
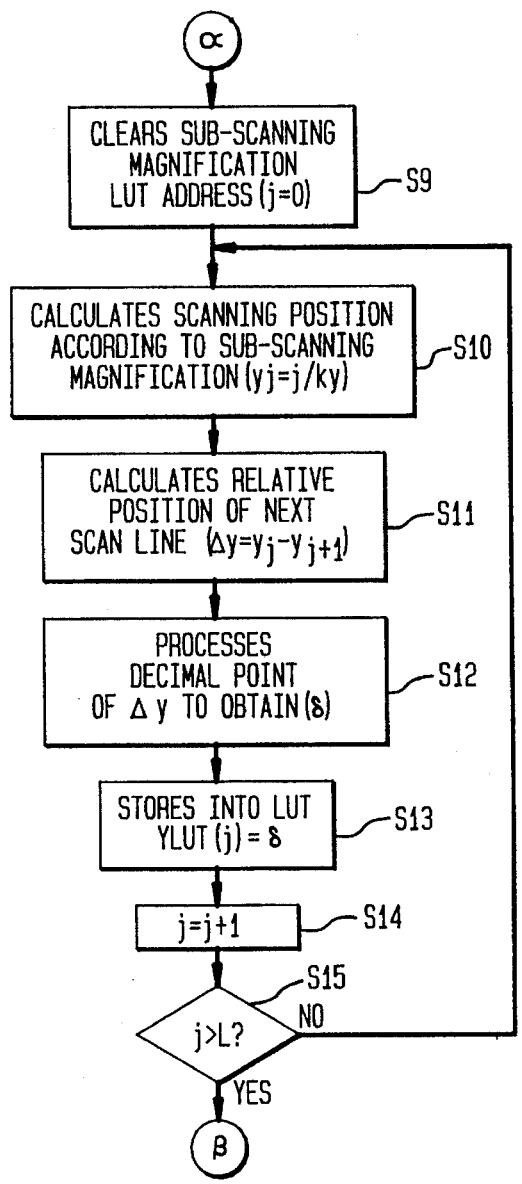
Figure 20C:
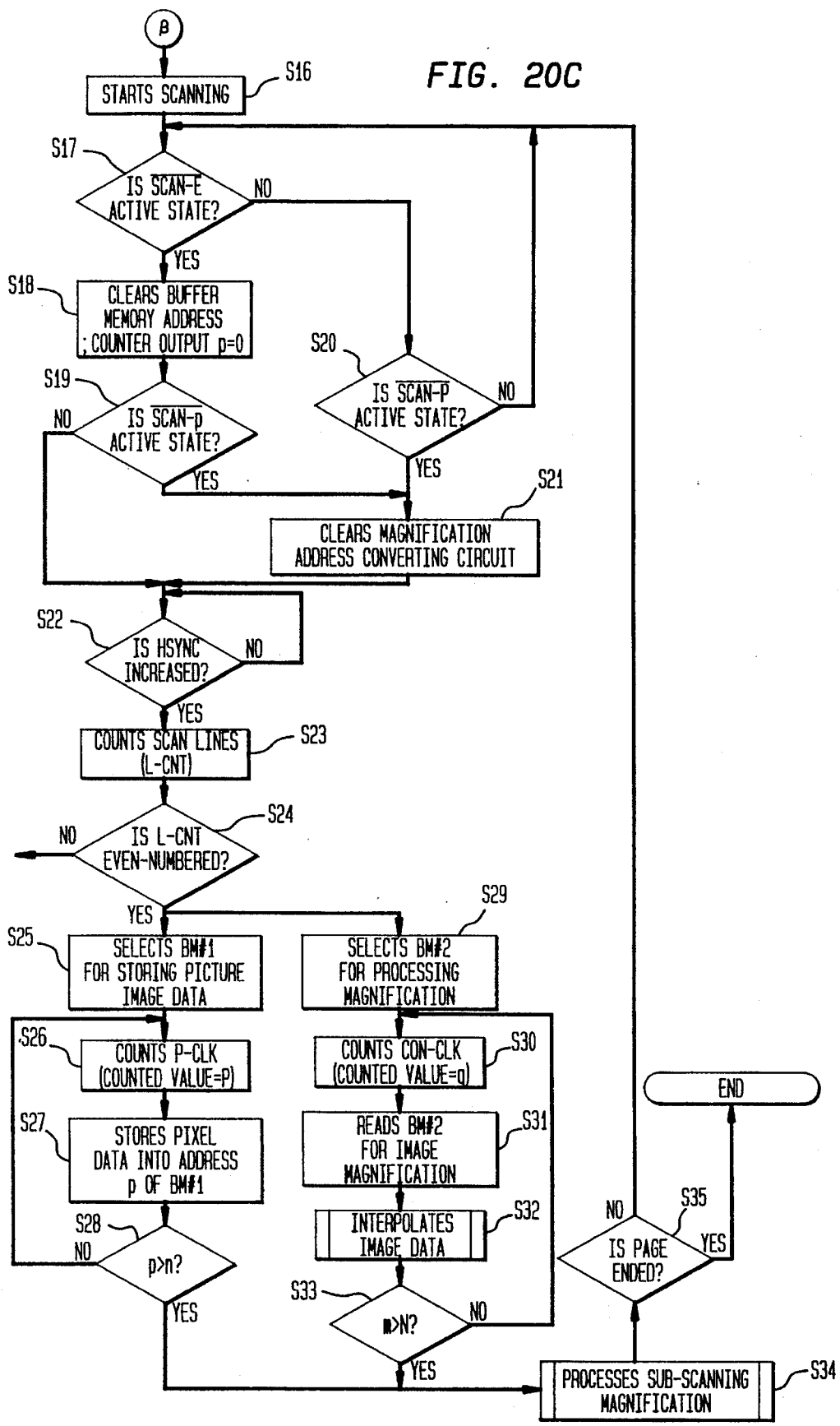

If the signal LUT-CS for storing the converted address to the LUT memory is unactivated, then the buffers 62, 67 and 69 in FIG. 18 are automatically enabled by an invertor 63 to access the LUT memory so as to perform the desired magnification process, as illustrated in FIG. 20(C).

The horizontal magnification conversion process will be described with reference to FIGS. 16, 17 and 20(c).

First, if the scanning is started and then the signal SCAN-E is activated at the steps S16 and S17, then the image storing address generator 41 is cleared by the signal PADD-CLR to set the buffer memory address to "0" (S18). Sequentially, the signal SCAN-P is activated so that the magnification variation address converting circuit 42 is set to be "0" by the signal CONADD-CLR (S20). If both the signals SCAN-E and SCAN-P unactivated (S16 and S20), then the control is on standby until the signals are activated.

While the signal SCAN-E is in an activated state and the signal SCAN-P is unactivated, or the signal SCAN-E is unactivated and the magnification address converting circuit 42 is cleared (S17, S20 and S21), the scanning lines are counted on the basis of the signal L-CNT for every increase of the signal HSYNC (S23). In the case of the odd-numbered increase of the signal L-CNT (YES at the step S24), the buffer memory 49 is selected for storing the image data (S25).

If the memory is selected for registering the image data, then the image data IMG-IN is stored into the address P of the buffer memory 49 designated by the image registering address generator 41 during the activation of the signal P-CLK (S27). In the case that the output P of the image registering address generator 41 is lower than the number n of the pixels read from one line while continuously being increased by the output P of the image registering address generator 41 by one (S28), the image data IMG-IN is sequentially stored into the buffer memory 49 with the address continuously designated by the image registering address generator 41. At the same time as the registration of the image data, the operation of reading data from the memory is effected for processing the desired magnification at the time of the odd-numbered increase of the signal L-CNT. That is, with every odd-numbered increase of the signal L-CNT, the buffer memory 49 is selected as a memory for storing the scanned image data while the buffer memory 50 is selected as a memory to be subjected to read data therefrom for processing the desired magnification (S29). When the memory (50) is selected for processing the desired magnification, the pixel data stored in the memory 50 with the address m designated by the magnification variation address converting circuit 42 during the activation of the signal CON-CLK is read from the memory 50 and then subjected to the interpolation process effected by the image data interpolating circuit 55 (S30, S31).

The output m of the magnification variation address converting circuit 42 is continuously increased by one. When the output of the circuit 42 is smaller than the number N of the pixel on one line to be magnified (S33), the image data is continuously read from the area of the buffer memory 50 addressed by the output m of the circuit 42 and then subjected to the interpolating process.

During the even-numbered increase of the signal L-CNT (No, at the step S24), the buffer memory 49 is selected as a memory subjected to the magnification process while the buffer memory 50 is selected as a memory for storing the image data. The operation of this state is effected similarly to the case of the odd-numbered increase of the signal L-CNT, as described above.

II. Vertical (sub-scanning direction) magnification conversion:

The magnification variation of the vertical direction is achieved on the basis of the principle as illustrated in FIG. 14. But the magnification of the horizontal direction is adjusted in accordance with the synchronous relation of a unit pixel on the same line, while that of the vertical direction is adjusted in accordance with the line synchronous relation in the same scanning page.

In the magnification correction of the horizontal direction, the pixels are inserted at the predetermined intervals of the pixel in accordance with the magnification ration in order to enlarge the copied image in size, while the pixels are deleted in order to reduce the copied image in size. The enlargement or reduction of the image is achieved by the image registering address generator 41 which controls the buffer memories 49 and 50 in FIG. 16.

In the enlargement of the image in the vertical direction, the insertion of new scanning lines is established. In the reduction of the image in the vertical direction, the deletion of the scanning lines, that is the skip of the position of the sensor module by predetermined lines is effected.

In case of enlargement, the insertion of new lines may be effected by repeatedly processing the contents of the buffer memory 49 or 50 in accordance with the number of the lines to be inserted. Also, the enlargement of the image may be achieved by repeatedly reading the sensor module by the number of predetermined lines under a condition that the sensor module is fixed at the position presently located thereof.

Accordingly, the magnification conversion function in the vertical direction is related to the position of the sensor, which depends on the control method for the motor as a sensor module driving means.

Figure 21:
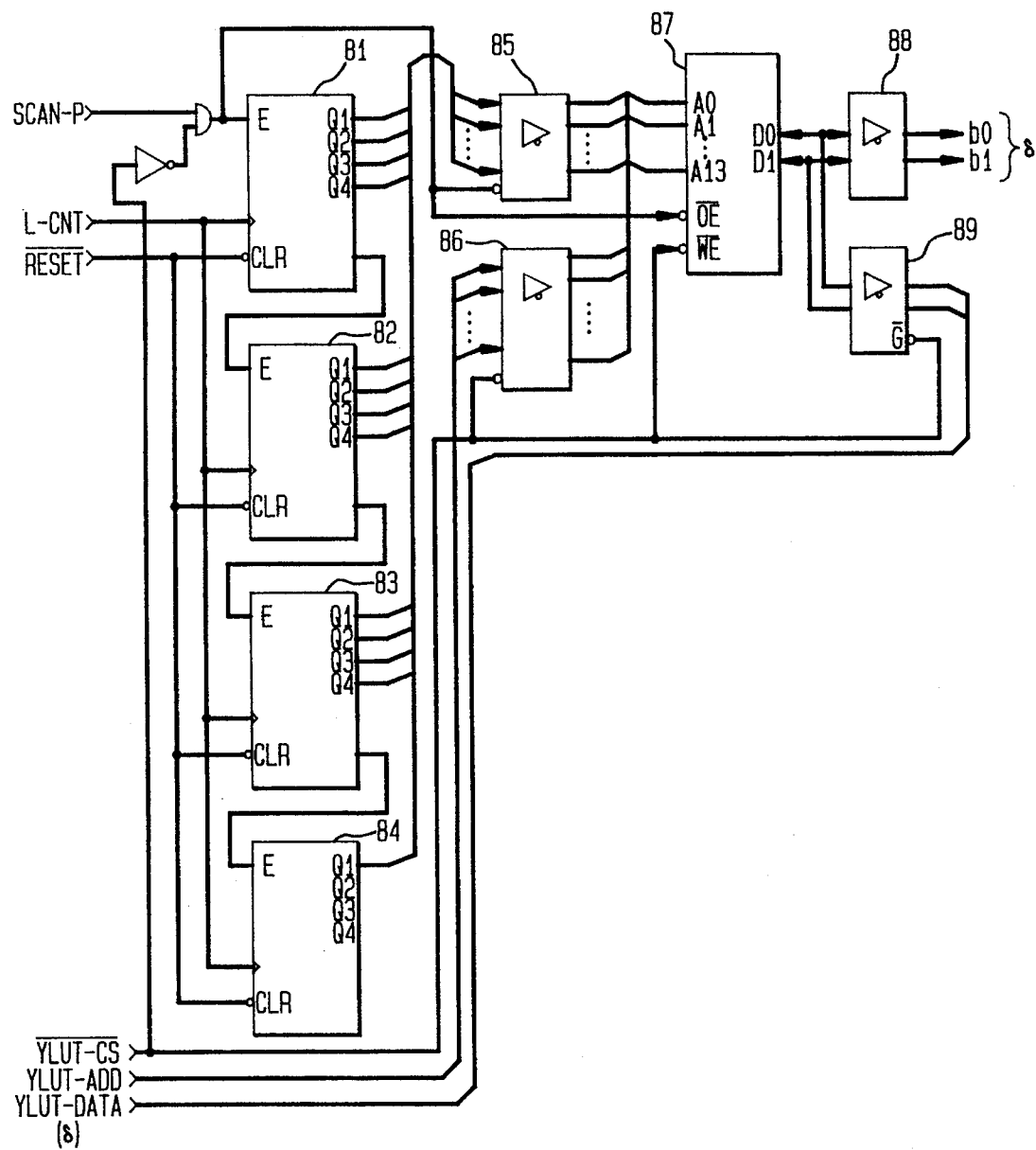
FIG. 21 is a block diagram illustrating the construction of the look-up table for processing a vertical magnification conversion according to the present invention.

FIG. 21 shows the construction of the LUT circuit for processing the magnification in the sub-scanning direction. The operation of the LUT circuit is generally divided into two processes, that is, a LUT value scheduling process for scheduling the LUT value similarly to the LUT circuit for the magnification process of the main-scanning direction, and a motor control process (that is, a magnification process) carried out by using the LUT value. FIG. 20(*b*) illustrates a flowchart for scheduling the LUT value in the sub-scanning direction.

The process for scheduling the LUT value of the vertical magnification is achieved by the CPU 100 in FIG. 1 under the enable condition of the buffers 86 and 89 in FIG. 21 (see FIG. 20 (*b*)). At this time, the magnification LUT value g is registered through the buffer 89 into the memory 87 for storing the vertical magnification LUT.

The value δ can be obtained by the operation of the flowchart illustrated in FIG. 20(*b*). First, the CPU 100 provides a reset signal RESET to the LUT circuits 81 to 84 to clear the LUT address j for the magnification process of the sub-scanning direction (S9). Then, the CPU 100 divides the LUT address j by the vertical magnification ration Ky while increasing the LUT address j by one to calculate the scanning position Yi according to the sub-scanning magnification and then calculates a relative scanning position Δγ of new lines (S10 and S11).

Thereinafter, the CPU 100 rounds the relative scanning position Δγ to obtain the magnification LUT value δ which in turn is stored to the LUT storing memory 87.

When the LUT address j for the magnification of the sub-scanning direction is smaller than the number L of the scanning line f one page (S15), the CPU 100 repeatedly effects the steps S10 to S14. In this case, the memory 87 for the vertical magnification LUT has a capacity of 2 bits.

More specifically, the horizontal magnification is needed for the relatively large width of data to receive the address corresponding to the scanning length of the line so as to store the address for reading the buffer memories 49 and 50 in FIG. 16. In the vertical magnification, the width of LUT data can be reduced in such a way that the sensor module has the relative position value for scanning the next line at the present position thereof.

For this reason, the memory 27 for the vertical magnification LUT has a capacity of 2-bit data.

The value δ can be set as the value shown in FIGS. 24*a*–24*c* in which 24(*a*) illustrates a case of the desired magnification ration Ky of 100%, 24(*b*) illustrates a case of the desired magnification ration of 50% and 24(*c*) illustrates a case of the desired magnification ration of 200%. By way of example, assume that a motor for driving the sensor module is embodied with a stepping motor having a rotating step angle θ per one pulse of the motor control signal and the sensor module can be moved by Δl (=1/400, for example) when the motor is rotated with the step angle θ. In the system having the line density of the sub-scanning direction of 400 dpi, the control parameter for the scanning line has a relation as illustrated in FIG. 24.

In FIG. 24 the value corresponding to the value δ can be expressed by 2 bits including b1 and b0 which are stored in the memory 87 for the vertical magnification LUT. If the value δ(b1, b0) is "0, 0" a new line is further scanned at the same position without shifting the position thereof. If the value δ is "0, 1" the motor is forward-driven by one step to effect the scanning of one line; whereas, if the value δ is "1, 0" the motor is forward-driven by two steps to effect the scanning for one line.

Figure 22:
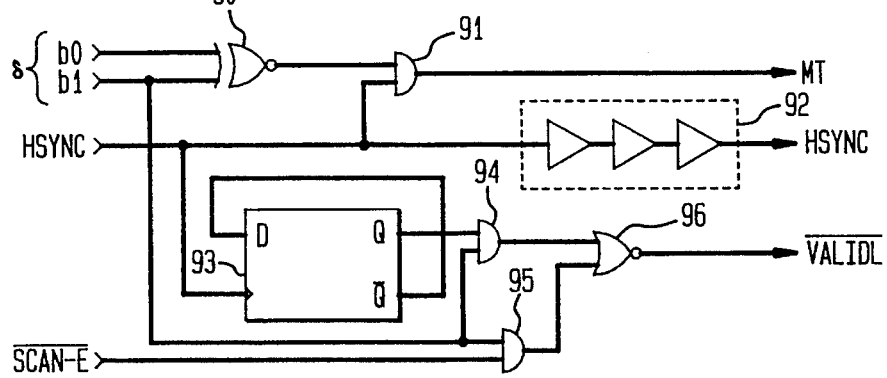
FIG. 22 is a circuit diagram of a vertical magnification process control circuit shown in FIG. 1.

The step movement of the motor can be achieved by means of the control circuit in FIG. 22, which shifts the pause of the motor by the value δ to control the position of the sensor module in order to effect the vertical magnification process.

In the drawing (FIG. 22), MT denotes a motor step driving pulse, VALIDL denotes a signal representing the effectiveness of one line scanning. Further in the case of a two-phase motor, waveforms in FIGS. 21 and 22 are similar to the waveforms in FIGS. 25 to 27 wherein FIG. 25 shows an example of the magnification process of 100%, FIG. 26 shows another example of the magnification ration of 200%, and FIG. 27 shows a further example of the magnification process of 50%. The circuit is operated in a composite manner of FIGS. 25 and 26 for the enlargement of 100% to 400%.

The circuit is operated in a composite manner of the FIGS. 26 and 27 for the reduction of 100% to 50%.

Figure 23:
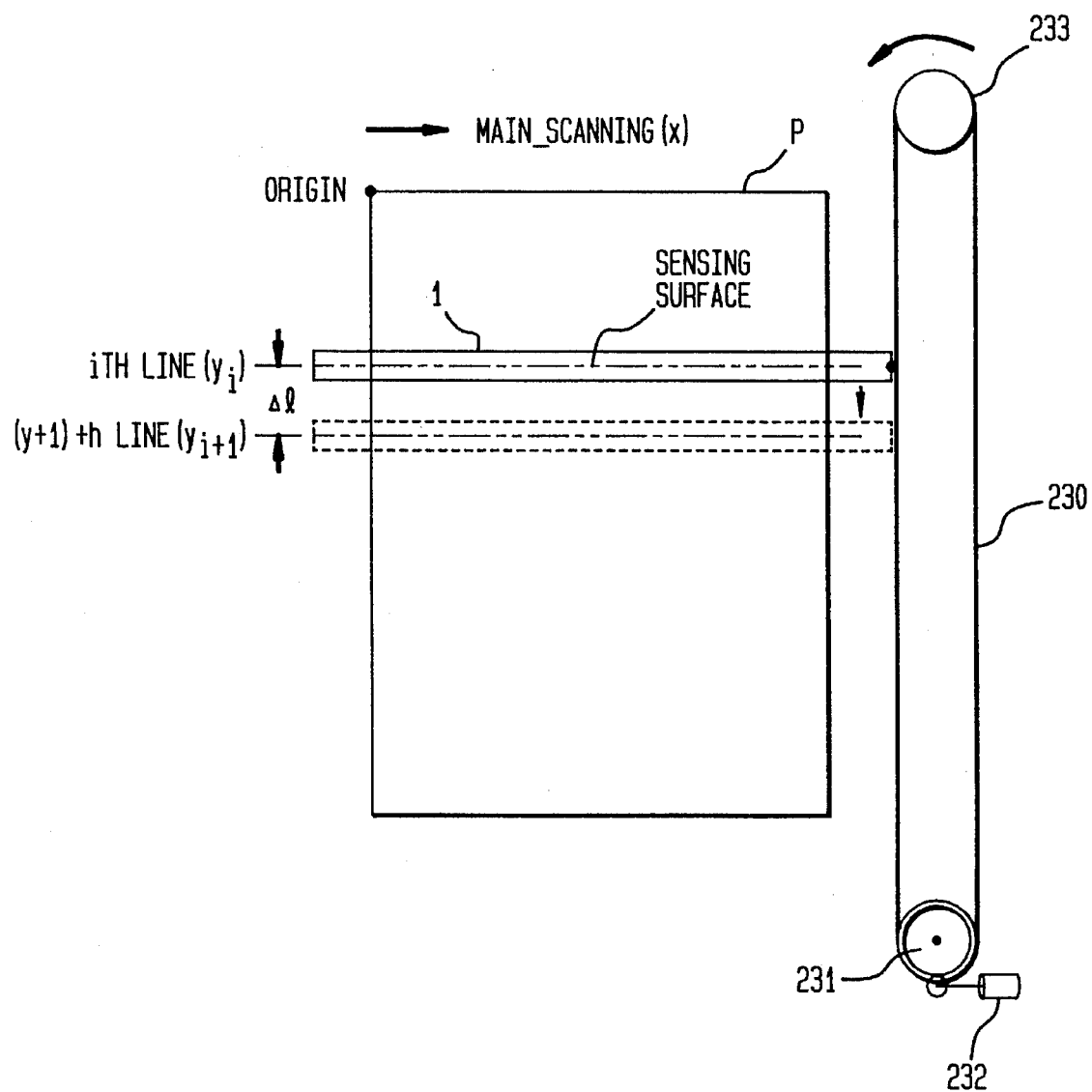
FIG. 23 illustrates the principle of a sub-scanning position control according to the present invention.

FIG. 23 shows a view illustrating the principle of the sub-scanning position control according to the present invention. In the drawing, a timing belt 230 is wound over a first timing gear 231 which is driven by the stepping motor 232 and a second timing gear 233.

The sensor module 1 is attached to a predetermined position of the timing belt 230.

Accordingly, the sensor module 1 is moved along the timing belt 230 and rotated by means of the stepping motor 232 and the first and second timing gears 231 and 233 so as to scan original P in the sub-scanning direction.

As described above, according to the present invention, the size of the output image can be arbitrarily adjusted only by way of an electrical process of the image data to arbitrarily select the pitches of the output scanning lines in the main and sub-scanning directions. As a result, the present invention has an advantage that the images having a variety of aspect ratios can be obtained with use of the same pixel data.

Although the present invention has been described with reference to the specific examples of the magnification conversion of the image, various modifications and changes can be made without departing from the scope of the invention.

What is claimed is:

1. A method for adjusting magnification of an image, comprising the steps of:

designating image input parameters;

setting a desired magnification of an original image;

producing control factors for the desired magnification of the original image;

scheduling function information for the desired magnification of the original image in main and sub-scanning directions by using the image input parameters and the control factors to form a look-up table;

inserting a pixel and a scan line at a predetermined interval when an enlarging magnification of the original image is set corresponding to the function information; and removing a pixel and a scan line from the same scan line, at which a pixel and a scan line are inserted, at a predetermined interval when a reducing magnification of the original image is set corresponding to the function information.

2. The method according to claim 1, wherein the step of scheduling function information further comprises:

sequentially providing a magnification conversion address x' of the main-scanning direction from a main-scanning magnification LUT address i;

storing the magnification conversion address into a main-scanning magnification look-up table;

calculating a scanning position corresponding to a sub-scanning magnification from a sub-scanning magnification LUT address j to determine a relative scanning position $\delta$ of a subsequent scanning line in order; and storing the relative scanning $\delta$ position in a sub-scanning magnification conversion look-up table LUT.

3. The method according to claim 2, wherein the step of sequentially providing the magnification conversion address further comprises the step of:

converting an address for a magnification ratio and a buffer memory reading address to an actual magnification address by an arithmetic logic unit (ALU).

4. The method according to claim 1, wherein the step of scheduling function information further comprises:

selecting a first block of at least logically blocked memory banks as a storage memory for image data;

selecting a second block as a magnification processing memory synchronized with a line scanning start signal L-CNT;

storing the image data in the storage memory;

reading out the image data from the magnification processing memory in synchronous with the step of storing the image data in the storage memory;

interpolating the image data by a predetermined interpolation method to provide the desired magnification of the image in the main-scanning direction;

shifting a phase of a drive means in response to the magnification function information in the sub-scanning direction; and controlling a position of a sensor means to provide the desired magnification in the sub-scanning direction.

5. The method according to claim 4, wherein when the magnification function in the sub-scanning direction is "0, 0", a previous scanning line is re-scanned without shifting the phase of the drive means; when the magnification function is "0, 1", the drive means is advanced by one step to scan one scanning line, when the magnification function is "1, 0", the drive means is advanced by two steps to scan one scanning line.

6. A device for adjusting magnification of an image, comprising:

first magnification processing means having a main-scanning direction for inserting or removing data related to at least one pixel to or from input pixel data on a same scanning line at a predetermined pixel interval in response to a horizontal magnification ratio; and second magnification processing means having a sub-scanning direction for inserting or removing data related to at least one scanning line to or from pixel data of each scanning line at a predetermined line interval in response to a vertical magnification ratio.

7. The device according to claim 6, wherein the first magnification processing means comprises:

a first address generating means for generating an image registration address to store input image data IMG-IN in synchronous with a pixel clock signal P-CLK;

a second address generating means for generating a reading magnification address to execute the magnification in response to the horizontal magnification in synchronous with a magnification clock signal CON-CLK;

first and second memory means for alternatively storing the input image data IMG-IN;

control means for dividing a line scanning start signal L-CNT by one half to simultaneously produce a storage control signal for storing scanned image data and a reading control signal for accessing the first and second memory means to execute a desired magnification adjusting process or converting process;

a magnification adjustment means for adjusting the magnification of image data provided from the first or second memory means by a predetermined interpolation method; and means for determining data transferring paths between the first or second memory means and the first address generating means, and between the first or second memory means, the magnification adjustment means and an input image data transferring path in response to the storage control signal and the reading control signal supplied from the control means.

8. The device according to claim 7, wherein the second address generating means comprises:

a look-up table memory means for storing magnification address data of the main-scanning direction from a central processing unit (CPU) in a look-up table; and means controlled by a control signal LUT-CS from the CPU for defining a path through which main-scanning magnification LUT address data and the magnification address data of the main-scanning direction are transferred.

9. A device according to claim 7, wherein the second address generating means further comprises an arithmetic logic unit (ALU).

10. A device according to claim 6, wherein the second magnification processing means of the sub-scanning direction comprises:

a third address generating means for generating a magnification address of the sub-scanning direction in synchronous with a line scanning start signal L-CNT;

a relative position storage memory controlled by a predetermined control signal YLUT-CS for storing a relative scanning position data $\delta$ related to a subsequent line in an area of the memory designated by a sub-scanning magnification address; and a control means for controlling a phase shift of a drive means in response to a relative position data $\delta$.

* * * * *